(12) United States Patent
Horiuchi et al.

(10) Patent No.: US 10,411,848 B2
(45) Date of Patent: *Sep. 10, 2019

(54) BASE STATION APPARATUS, TERMINAL APPARATUS, TRANSMISSION METHOD, AND RECEPTION METHOD

(71) Applicant: Sun Patent Trust, New York, NY (US)

(72) Inventors: Ayako Horiuchi, Kanagawa (JP); Kazuki Takeda, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,894

(22) Filed: Nov. 6, 2017

(65) Prior Publication Data

US 2018/0062798 A1    Mar. 1, 2018

Related U.S. Application Data

(63) Continuation of application No. 15/220,231, filed on Jul. 26, 2016, now Pat. No. 9,838,172, which is a
(Continued)

(30) Foreign Application Priority Data

Jul. 25, 2012    (JP) ................ 2012-164619

(51) Int. Cl.
*H04L 5/00* (2006.01)
*H04W 72/04* (2009.01)
*H04W 88/08* (2009.01)

(52) U.S. Cl.
CPC ............ *H04L 5/001* (2013.01); *H04L 5/0053* (2013.01); *H04W 72/042* (2013.01); *H04W 72/0406* (2013.01); *H04W 88/08* (2013.01)

(58) Field of Classification Search
CPC .. H04L 5/001; H04L 5/0053; H04W 72/0406; H04W 72/042; H04W 88/08
See application file for complete search history.

(56) References Cited

U.S. PATENT DOCUMENTS 8,565,254 B2    10/2013  Okubo et al.
9,049,709 B2     6/2015  Saito et al.
(Continued)

FOREIGN PATENT DOCUMENTS

EP    2 503 727 A1    3/2011
JP    2010-114780 A   5/2010
(Continued)

OTHER PUBLICATIONS

Alcatel-Lucent Shanghai Bell, Alcatel-Lucent, "DCI Multiplexing for ePDCCH," R1-121253, Agenda Item: 7.6.3, 3GPP TSG RAN WG1 Meeting #68bis, Jeju, Korea, Mar. 26-30, 2012, 3 pages.
(Continued)

*Primary Examiner* — Walli Z Butt
(74) *Attorney, Agent, or Firm* — Seed IP Law Group LLP

(57) ABSTRACT

Disclosed is a base station apparatus in which a configuration section (102) configures, within a data assignable region for a terminal apparatus (200), a first search space and a second search space each being a candidate to which control information is assigned, each of the first search space and the second search space including a plurality of control channel elements, and a signal assignment section (105) assigns control information to each of the first search space and the second search space. In addition, the configuration section (102) allocates numbers to a plurality of first control channel elements included in the first search space in an ascending order, and allocates numbers larger than or identical with the
(Continued)

numbers allocated to the first control channel elements to a plurality of second control channel elements included in the second search space.

16 Claims, 18 Drawing Sheets

Related U.S. Application Data continuation of application No. 14/941,402, filed on Nov. 13, 2015, now Pat. No. 9,432,989, which is a continuation of application No. 14/234,089, filed as application No. PCT/JP2013/003904 on Jun. 21, 2013, now Pat. No. 9,220,090.

(56) References Cited

U.S. PATENT DOCUMENTS

| | | | |
|---|---|---|---|
| 9,220,090 B2 * | 12/2015 | Horiuchi | H04W 72/0406 |
| 9,432,989 B2 * | 8/2016 | Horiuchi | H04W 72/0406 |
| 9,838,172 B2 * | 12/2017 | Horiuchi | H04W 72/0406 |
| 2011/0103321 A1 | 5/2011 | Nishio et al. | |
| 2011/0110316 A1 | 5/2011 | Chen et al. | |
| 2011/0243059 A1 | 10/2011 | Liu et al. | |
| 2011/0310817 A1 | 12/2011 | Okubo et al. | |
| 2012/0113932 A1 | 5/2012 | Nishio et al. | |
| 2013/0121295 A1 * | 5/2013 | Saito | H04L 5/001 370/329 |
| 2013/0155990 A1 | 6/2013 | Nishio et al. | |
| 2013/0215842 A1 | 8/2013 | Han et al. | |
| 2013/0242882 A1 | 9/2013 | Blankenship et al. | |
| 2013/0272250 A1 | 10/2013 | Shimezawa et al. | |
| 2013/0301562 A1 * | 11/2013 | Liao | H04W 72/042 370/329 |
| 2014/0105154 A1 | 4/2014 | Yang et al. | |
| 2014/0204836 A1 * | 7/2014 | Johansson | H04W 72/042 370/328 |
| 2014/0328302 A1 | 11/2014 | Park et al. | |
| 2015/0289240 A1 * | 10/2015 | Zhu | H04W 4/70 370/329 |

FOREIGN PATENT DOCUMENTS

| | | | |
|---|---|---|---|
| JP | 2012-138753 A | 7/2012 | |
| WO | 2010/070197 A1 | 6/2010 | |
| WO | 2011/128013 A1 | 10/2011 | |
| WO | WO-2011128013 A1 * | 10/2011 | H04L 5/0007 |
| WO | 2012/011239 A1 | 1/2012 | |
| WO | 2012/029245 A1 | 3/2012 | |

OTHER PUBLICATIONS

English Translation of Taiwanese Search Report, dated Jul. 5, 2017, for corresponding Taiwanese Application No. 102123525, 2 pages.
ETSI TS 136 211 V10.4.0, "LTE; Evolved Universal Terrestrial Radio Access (E-UTRA); Physical channels and modulation," 3GPP TS 36.211 version 10.4.0 Release 10, Jan. 2012, 103 pages.
ETSI TS 136 213 V10.4.0, "LTE; Evolved Universal Terrestrial Radio Access (E-UTRA); Physical layer procedures," 3GPP TS 36.213 version 10.4.0 Release 10, Jan. 2012, 127 pages.
Extended European Search Report dated Jun. 16, 2015, for corresponding EP Application No. 13817840.5-1851 / 2879452, 8 pages.
Fujitsu, "Definition of eREG and eCCE," R1-122068, 3GPP TSG RAN WG1 Meeting #69, Agenda Item: 7.6.4.2, Prague, Czech Republic, May 21-25, 2012, 4 pages.
International Search Report, dated Aug. 14, 2013, for corresponding International Application No. PCT/JP2013/003904, 9 pages.
NTT DOCOMO, "On the Need of Common Search Space for E-PDCCH," R1-121476, Agenda Item: 7.6.2, 3GPP TSG RAN WG1 Meeting #68bis, Jeju, Korea, Mar. 26-30, 2012, 4 pages.
Motorola, "Search Space Definition: Reduced PDCCH Blind Detection for Split PDCCH Search Space," R1-073996, 3GPP TSG RAN1#50bis, Agenda Item: 6.2.3, Shanghai, China, Oct. 8-12, 2007, 4 pages.
Panasonic, Sharp, NTT DOCOMO, "Way forward on ePDCCH search space," R1-122979, Agenda Item: 7.6.4.3, TSG-RAN WG1 Meeting #69, Prague, Czech, May 21-25, 2012, 3 pages.
Samsung, "Multiplexing of Multiple E-PDCCHs for Distributed and Localized Transmissions," R1-120191, 3GPP TSG RAN WG1 #68, Agenda Item: 7.6.4, Dresden, Germany, Feb. 6-10, 2012, 3 pages.
Extended European Search Report, dated May 20, 2019, for European Application No. 19152717.5-1219, 9 pages.
InterDigital, et al., "WF on ePDCCH," R1-122907, 3GPP TSG RAN WG1 #69, Agenda Item: 7.6.4, Prague, Czech Republic, May 21-25, 2012, 2 pages.
LG Electronics, "Multiplexing of Localised and Distributed ePDCCH parts in same PRBs," R1-122310, 3GPP TSG RAN WG1 Meeting #69, Agenda Item: 7.6.4.4, Prague, Czech Republic, May 21-25, 2012, 3 pages.
NTT DOCOMO, "Mapping Design for E-PDCCH in Rel-11," R1-114081, 3GPP TSG RAN WG1 Meeting #67, Agenda Item: 7.7.4, San Francisco, USA, Nov. 14-18, 2011, 5 pages.

* cited by examiner

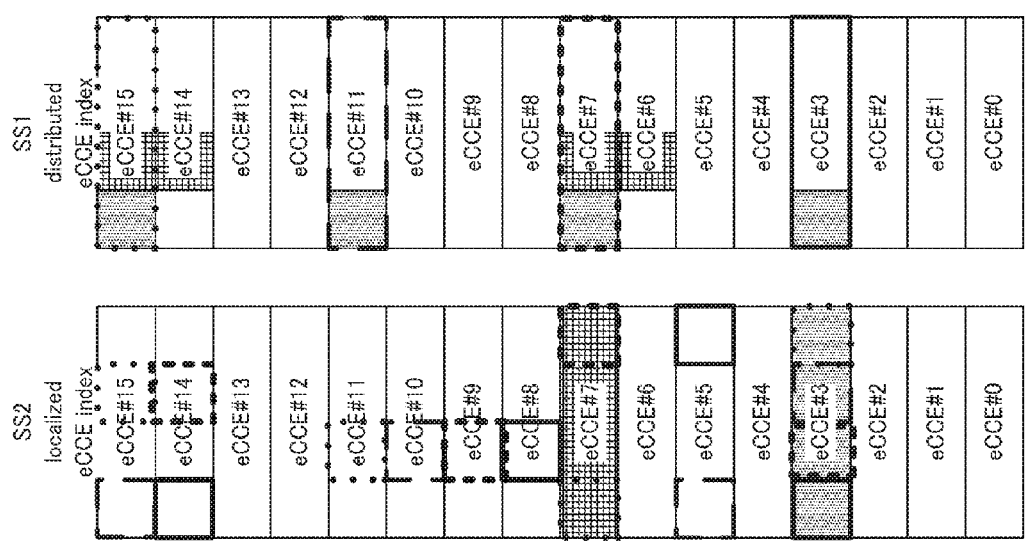

BASE STATION APPARATUS, TERMINAL APPARATUS, TRANSMISSION METHOD, AND RECEPTION METHOD

TECHNICAL FIELD

The present invention relates to a base station apparatus, a terminal apparatus, a transmission method, and a reception method.

BACKGROUND ART

In recent years, accompanying the adoption of multimedia information in cellular mobile communication systems, it has become common to transmit not only speech data but also a large amount of data such as still image data and moving image data. Furthermore, studies are being actively conducted in LTE-Advanced (Long Term Evolution Advanced) to realize high transmission rates by utilizing broad radio bands, Multiple-Input Multiple-Output (MIMO) transmission technology, and interference control technology.

In addition, taking into consideration the introduction of various devices as radio communication terminals in M2M (machine to machine) communication and the like as well as an increase in the number of multiplexing target terminals due to MIMO transmission technology, there is a concern regarding a shortage of resources in a region (that is, a "PDCCH region") to which a PDCCH (Physical Downlink Control Channel) to be used for a control signal is assigned. A DL grant (also referred to as "DL assignment"), which indicates a downlink (DL) data assignment, and a UL grant, which indicates an uplink (UL) data assignment, are transmitted on a PDCCH. The DL grant notifies the terminal that a resource in the subframe in which the DL grant is transmitted has been assigned to the terminal. The UL grant notifies that a resource in a target subframe defined in advance by the UL grant has been assigned to the terminal. If a control signal (PDCCH) cannot be assigned due to such resource shortage of the PDCCH region, downlink data cannot be assigned to the terminals. Therefore, even if a resource region (i.e., a "PDSCH (Physical Downlink Shared Channel) region") to which downlink data is to be assigned is available, the resource region may not be used, which causes a decrease in the system throughput.

As a method for solving such resource shortage of the PDCCH region, a study has been carried out on arranging, in a data region, control signals for radio terminal apparatuses (hereinafter, abbreviated as "terminal" and also referred to as "UE (User Equipment)") served by a radio base station apparatus (hereunder, abbreviated as "base station"). A resource region in which control signals for terminals served by the base station are assigned is referred to as an Enhanced PDCCH (ePDCCH) region, a New-PDCCH (N-PDCCH) region, an X-PDCCH region or the like. Assigning the control signal (i.e., ePDCCH) in a data region as described above enables transmission power control on control signals transmitted to a terminal near a cell edge or interference control for interference by a control signal to another cell or interference from another cell to the cell provided by the base station.

A study has been carried out on assigning an ePDCCH to a logical resource, which is referred to as eCCE (enhanced Control Channel Elements), and then assigning the ePDCCH to a physical resource (for example, see FIG. 1). In the LTE and LTE-Advanced systems, one RB (resource block) has 12 subcarriers in the frequency domain and has a width of 0.5 msec in the time region (for example, see NPL 1). A unit in which two RBs are combined in the time region is referred to as an RB pair (for example, see FIG. 1). That is, an RB pair has 12 subcarriers in the frequency domain, and has a width of 1 msec in the time region. When an RB pair represents a group of 12 subcarriers on the frequency axis, the RB pair may be referred to as simply "RB." In addition, in a physical layer, an RB pair is also referred to as a PRB pair (physical RB pair). A resource element (RE) is a unit defined by a single subcarrier and a single OFDM symbol (see FIG. 1).

The number of eCCEs that are used to transmit the ePDCCH is referred to as an aggregation level. The base station determines the application level according to the channel quality between the base station and the terminal.

A set of assignment candidates (ePDCCH candidates) of a resource region, to which the ePDCCH is assigned, is referred to as a search space. The search space for the ePDCCH is configured for an individual terminal by higher layer signaling. As a method for higher layer signaling, a study has been carried out on designating the number of a PRB pair corresponding to the search space among the PRB pairs as a physical resource unit. The terminal recognizes, as the search space of the terminal, PRB pairs that are identified by the PRB pair number notified by higher layer signaling, a configuration pattern (the aggregation level, the number of ePDCCH candidates of each aggregation level, a shift pattern, and the like) separately defined in advance. The terminal monitors the search space of the terminal to detect an ePDCCH intended for the terminal.

"Localized assignment" that assigns ePDCCHs collectively at positions close to each other on the frequency band, and "distributed assignment" that assigns ePDCCHs by distributing the ePDCCHs on the frequency band are being studied as assignment methods for ePDCCHs (for example, see FIG. 1). Localized assignment is an assignment method for obtaining a frequency scheduling gain, and can be used to assign ePDCCHs to resources that have favorable channel quality based on channel quality information. Distributed assignment distributes ePDCCHs on the frequency axis, and can obtain a frequency diversity gain. In the LTE-Advanced system, both a search space for localized assignment and a search space for distributed assignment may be configured.

In the localized assignment, each eCCE may be assigned in a unit in which a PRB pair is divided into four, three, or two eCCEs. In the localized assignment, when the aggregation level is equal to or larger than 2, a plurality of eCCEs to which an ePDCCH is assigned are assigned to the same PRB pair. However, when the aggregation level is larger than the number of divisions of the PRB pair, the eCCEs are assigned to a plurality of PRB pairs.

In the distributed assignment, the eCCEs are assigned to a plurality of PRB pairs. A resource (RE group) that is obtained by dividing a PRB pair is referred to as an eREG (enhanced Resource Element Group), and one eCCE is assigned to a plurality of eREGs that belong to different PRB pairs. As a method of dividing a PRB pair into eREGs, there is a method of dividing a PRB pair in subcarrier units, a method of generating and dividing a resource (RE) group, or the like. The number of divisions of a PRB pair (the number of eREGs per PRB pair) may be 8, 12, 16, 24, 36, and the like (for example, see FIGS. 2A to 2C; when the number of divisions is 8, 16, and 36).

The base station can configure the search spaces of a plurality of terminals in the same PRB pair. Since a minimum unit for transmitting an ePDCCH becomes a resource region smaller than a PRB pair, the ePDCCHs of a plurality of terminals are arranged in the same resource region or in different resource regions within the same PRB pair, thereby reducing the number of PRB pairs for the ePDCCH and increasing the number of PRB pairs for data. Accordingly, there is a need for a method of configuring a search space that can be shared by a plurality of terminals.

In the LTE-Advanced, a study has been carried out on configuring a plurality of search spaces of ePDCCHs for each terminal. For example, as a case in which a plurality of search spaces of ePDCCHs are configured for each terminal, the following cases (1) to (3) can be identified.

(1) Common Search Space and UE Specific Search Space

A common search space that is used to transmit special control signals and a UE specific search space into which a DL assignment and a UL grant of an individual terminal are transmitted are configured in each terminal. The special control signals include system information, paging, RACH response, PUDCCH power control, PUDSCH power control, and the like, and control signals masked with SI-RNTI, P-RNTI, RA-RNTI, TPC-PUCCH-RNTI, and TPC-PUSCH-RNTI are transmitted.

(2) Two UE Specific Search Space

Two UE specific search spaces (for example, search space 1 and search space 2) of each individual terminal are configured (for example, see NPL 3). For example, the search space 1 is used for more robust transmission than the search space 2. The robust transmission is attained by using a PRB pair in which interference control with other cells is performed, configuring the position of an ePDCCH candidate having a high aggregation level, configuring the position of an ePDCCH candidate having a high frequency, space, or time diversity order, or the like.

An operation becomes possible, where, by assigning the search space 1 of the two search spaces so as to be shared between a plurality of terminals, when the number of terminals per subframe is small, only the search space 1 is used, and when the number of terminals increases, the search space 2 is further used. By adapting this configuration, when the number of terminals is small, it is possible to reduce the number of PRB pairs for an ePDCCH, thereby increasing the number of PRB pairs that can be used for data transmission. At this time, the search space 2 varies for each terminal and a terminal in which the search space 2 is used is selected to change the PRB pairs for the ePDCCH, thereby improving flexibility of the use of the PRB pairs.

The search space 1 may be for distributed assignment, and the search space 2 may be for localized assignment. In this case, when the reliability of feedback information is high, the search space 2 (localized assignment) is used, and PRB pairs having excellent characteristics inherent in the terminal can be assigned. When reliability of feedback information is low, switching to the use of the search space 1 (distributed assignment) is made to obtain the frequency diversity gain, and the PRB pairs are shared with other terminals, thereby improving the utilization efficiency of the PRB pairs.

(3) Band Extension Function (CA: Carrier Aggregation) and Cross Carrier Scheduling The CA is a function that is newly introduced in the LTE-Advanced, and brings a plurality of LTE system regions called component carriers (CC) together, thereby realizing improvement of the maximum transmission rate (see NPL 2). When a terminal uses a plurality of CCs, one CC is configured as a primary cell (PCell), and the remaining CCs are configured as secondary CCs (SCell). The configuration of the PCell and the SCells may vary for each terminal. The cross carrier scheduling is a resource assignment method in which inter-cell interference control is performed in a CC unit in a PDCCH. In the cross carrier scheduling, the base station can transmit DL grants and UL grants of other CCs in the PDCCH region of a certain CC. If the cross carrier scheduling is applied, the PDCCH is transmitted from different CCs between adjacent cells, thereby reducing inter-cell interference of the PDCCH.

During the CA operation, when the cross carrier scheduling is configured, controls signals for a plurality of CCs are collected into one CC, and a plurality of search spaces corresponding to each of a plurality of CCs (PCell and SCells) are configured.

The cases (1) to (3) where a plurality of search spaces of ePDCCHs for each terminal have been described.

In the LTE, as a feedback method (A/N mapping method) of a response signal (ACK/NACK signal, A/N signal) for downlink data assignment, A/N mapping (PUCCH (Physical Uplink Control CHannel) format 1a: BPSK) during one code word (CW) processing and A/N mapping (PUCCH format 1b: QPSK) during 2CW processing are adopted.

When a DL assignment is transmitted using a PDCCH, a resource (PUCCH resource) of the PUCCH is defined in association with a CCE index of a first CCE among CCEs (Control Channel Element) as a resource used to transmit the DL assignment on a one-to-one basis. The PUCCH resource is called an implicit resource. The CCEs are resources that are generated by dividing the resource (PDCCH resource) of the PDCCH, and are attached with CCE indexes that do not overlap each other. A CCE index is recognized commonly between terminals within a cell.

The DL assignment and the UL grant are assigned to one CCE (Aggregation level: 1) or a plurality of CCEs (Aggregation level: 2, 4, 8) according to the aggregation level to be set. When control information is assigned to a plurality of CCEs, the control information is assigned to CCEs having continuous CCE indexes.

In the LTE, the PDCCH is demodulated with a CRS (Cell-specific Reference Signal) as a reference signal. An antenna port of a CRS to be used is common between terminals within a cell. Accordingly, it is difficult to apply MU-MIMO (Multi user MIMO) in which a plurality of DL assignments or UL grants are transmitted by the same CCE.

Since one PDCCH region is configured per cell, there is no case where the CCE indexes of the CCEs to which the DL assignment and the UL grant are assigned overlap between terminals within a cell. That is, when a terminal within the cell uses the PDCCH region, it is designed such that there is no collision of the PUCCH resources associated with the CCE indexes.

However, exceptionally, when the PUCCH is transmitted through two antenna ports and when channel selection is applied to the PUCCH, two PUCCH resources are implicitly designated from the CCE indexes that are used for one DL assignment. For example, PUCCH resources respectively associated with first CCE index #N and next CCE index #N+1 are used. Here, if the DL assignment of the other terminal is assigned using the CCE of CCE index #N+1, there is collision of the PUCCH resources that are used between terminals. The base station does not use CCE index #N+1 for a DL assignment or a UL grant is assigned to CCE index #N+1, thereby avoiding collision of the PUCCH resources. Since there are many cases where a DL assignment that indicates transmission of two CWs has an aggregation level equal to or larger than 2, collision of the PUCCH resources does not become a significant problem as much. In this way, in the PDCCH, since there is no case where the CCE indexes to be used collide within the same cell, collision of the PUCCH resources does not become a major problem.

CITATION LIST

Non-Patent Literature

NPL 1
3GPP TS 36.211 V10.4.0, "Physical Channels and Modulation"
NPL 2
3GPP TS 36.213 V10.4.0, "Physical layer procedures"
NPL 3
R1-122979, "Way forward on ePDCCH search space"

SUMMARY OF INVENTION

Technical Problem

In the above-described ePDCCH, similarly to the PDCCH, a study has been carried out on implicit assignment in which the eCCE indexes and the PUCCH resources are associated with each other on a one-to-one basis (for example, see FIG. 3).

However, as described above, an ePDCCH search space may be configured for an individual terminal by higher layer signaling. Accordingly, the eCCE index corresponding to the PRB pair number indicated as the ePDCCH search space may vary for each terminal. Although the association between the eCCE indexes and the PUCCH resources is shared between the terminals, if the eCCE index corresponding to the PRB pair number varies between the terminals, in the implicit assignment of the eCCE indexes and the PUCCH resources, the PUCCH resources may collide due to collision of the eCCE indexes.

FIG. 4 illustrates an example in which PUCCH resources collide due to collision of the eCCE indexes. In FIG. 4, localized assignment is applied to an ePDCCH, and a search space 1 (SS1) and a search space 2 (SS2) are configured in UE1 and UE2. The search space 1 is shared by UE1 and UE2 and assigned to PRB pairs #2, #8, #14, and #20. The search space 2 of UE1 is assigned to PRB pairs #0, #1, #22, and #23, and the search space 2 of UE2 is assigned to PRB pairs #3, #9, #15, and #21. In FIG. 4, four CCEs are assigned per PRB pair.

The terminals (UE1 and UE2) allocate the eCCE indexes in an ascending order of the PRB pair numbers corresponding to the search space set in each terminal. Accordingly, UE1 recognizes that the ePDCCH addressed to UE1 is likely to be transmitted to PRB pairs #0, #1, #2, #8, #14, #20, #22, and #23, and allocates the eCCE indexes (CCE #0 to CCE #31) in an order of PRB pairs #0, #1, #2, #8, #14, #20, #22, and #23. Similarly, UE2 allocates the eCCE indexes (CCE #0 to CCE #31) in an order of PRB pairs #2, #3, #8, #9, #14, #15, #20, and #21. As illustrated in FIG. 4, the eCCE index corresponding to the same PRB pair number may vary between UE1 and UE2. That is, the PRB pair number corresponding to the same eCCE index may vary between UE1 and UE2.

For example, in FIG. 4, while eCCE #12 of UE1 is assigned to PRB pair #8, eCCE #12 of UE2 is assigned to PRB pair #9. Accordingly, the base station can simultaneously transmit the ePDCCH to both UE1 and UE2 using eCCE #12. However, in UE1 and UE2, since the same PUCCH resource (in FIG. 3, PUCCH #12) associated with eCCE #12 is used, there is collision of the PUCCH resources between UE1 and UE2. Therefore, in FIG. 4, in order to simultaneously use eCCE #12 for UE1 and UE2, it is necessary to associate different PUCCH resources with eCCE #12 to be used by UE1 and eCCE #12 to be used by UE2.

In this way, when a plurality of ePDCCH search spaces are configured for one terminal, in order to avoid collision of the PUCCH resources to be used between terminals, the number of PUCCH resources increases. For this reason, in the uplink, the number of resources (PUSCH resources) that can be used to transmit uplink data (PUSCH) is reduced, and uplink throughput is reduced.

An object of the present invention is to provide a base station apparatus, a terminal apparatus, a transmission method, and a reception method capable of avoiding collision of PUCCH resources between terminals while limiting an increase in the number of PUCCH resources even when a plurality of search spaces are configured with respect to an ePDCCH for a single terminal.

Solution to Problem

A base station apparatus according to an aspect of the present invention includes: a configuration section that configures, within a data assignable region for a terminal apparatus, a first search space and a second search space each being a candidate to which control information is assigned, each of the first search space and the second search space including a plurality of control channel elements; and a transmission section that transmits the control information assigned to each of the first search space and the second search space, in which: a number of a control channel element to which the control information is assigned is associated on a one-to-one basis with an uplink resource to be used to transmit a response signal to downlink data; and the configuration section allocates numbers to a plurality of first control channel elements included in the first search space in an ascending order, and allocates numbers larger than or identical with the numbers allocated to the first control channel elements to a plurality of second control channel elements included in the second search space.

A terminal apparatus according to an aspect of the present invention includes: a configuration section that configures, within a data assignable region, a first search space and a second search space each being a candidate to which control information is assigned, each of the first search space and the second search space including a plurality of control channel elements; and a reception section that receives the control information assigned to each of the first search space and the second search space, in which: a number of a control channel element to which the control information is assigned is associated on one-to-one basis with an uplink resource to be used to transmit a response signal to downlink data; and the configuration section allocates numbers to a plurality of first control channel elements included in the first search space in an ascending order, and allocates numbers larger than or identical with the numbers allocated to the first control channel elements to a plurality of second control channel elements included in the second search space.

A transmission method according to an aspect of the present invention includes: configuring, within a data assignable region for a terminal apparatus, a first search space and a second search space each being a candidate to which control information is assigned, each of the first search space and the second search space including a plurality of control channel elements; and transmitting the control information assigned to each of the first search space and the second search space, in which: a number of a control channel element to which the control information is assigned is associated on a one-to-one basis with an uplink resource to be used to transmit a response signal to downlink data; and numbers are allocated to a plurality of first control channel elements included in the first search space in an ascending order, and numbers larger than or identical with the numbers allocated to the first control channel elements are allocated to a plurality of second control channel elements included in the second search space.

A reception method according to an aspect of the present invention includes: configuring, within a data assignable region for a terminal apparatus, a first search space and a second search space each being a candidate to which control information is assigned, each of the first search space and the second search space including a plurality of control channel elements; and receiving the control information assigned to each of the first search space and the second search space, in which: a number of a control channel element to which the control information is assigned is associated on a one-to-one basis with an uplink resource to be used to transmit a response signal to downlink data; and numbers are allocated to a plurality of first control channel elements included in the first search space in an ascending order, and numbers larger than or identical with the numbers allocated to the first control channel elements are allocated to a plurality of second control channel elements included in the second search space.

Advantageous Effects of Invention

According to the present invention, even when a plurality of search spaces are configured with respect to an ePDCCH for a single terminal, it is possible to avoid collision of PUCCH resources between terminals while limiting an increase in the number of PUCCH resources.

BRIEF DESCRIPTION OF DRAWINGS

FIGS. 16A and 16B are diagrams provided for describing a problem of eCCE assignment in a PRB pair according to Embodiment 4 of the present invention;

FIGS. 18A and 18B are diagrams illustrating a search space configuration example according to Embodiment 4 of the present invention (the number of divisions of a PRB pair: 8)

DESCRIPTION OF EMBODIMENTS

Figure 1:
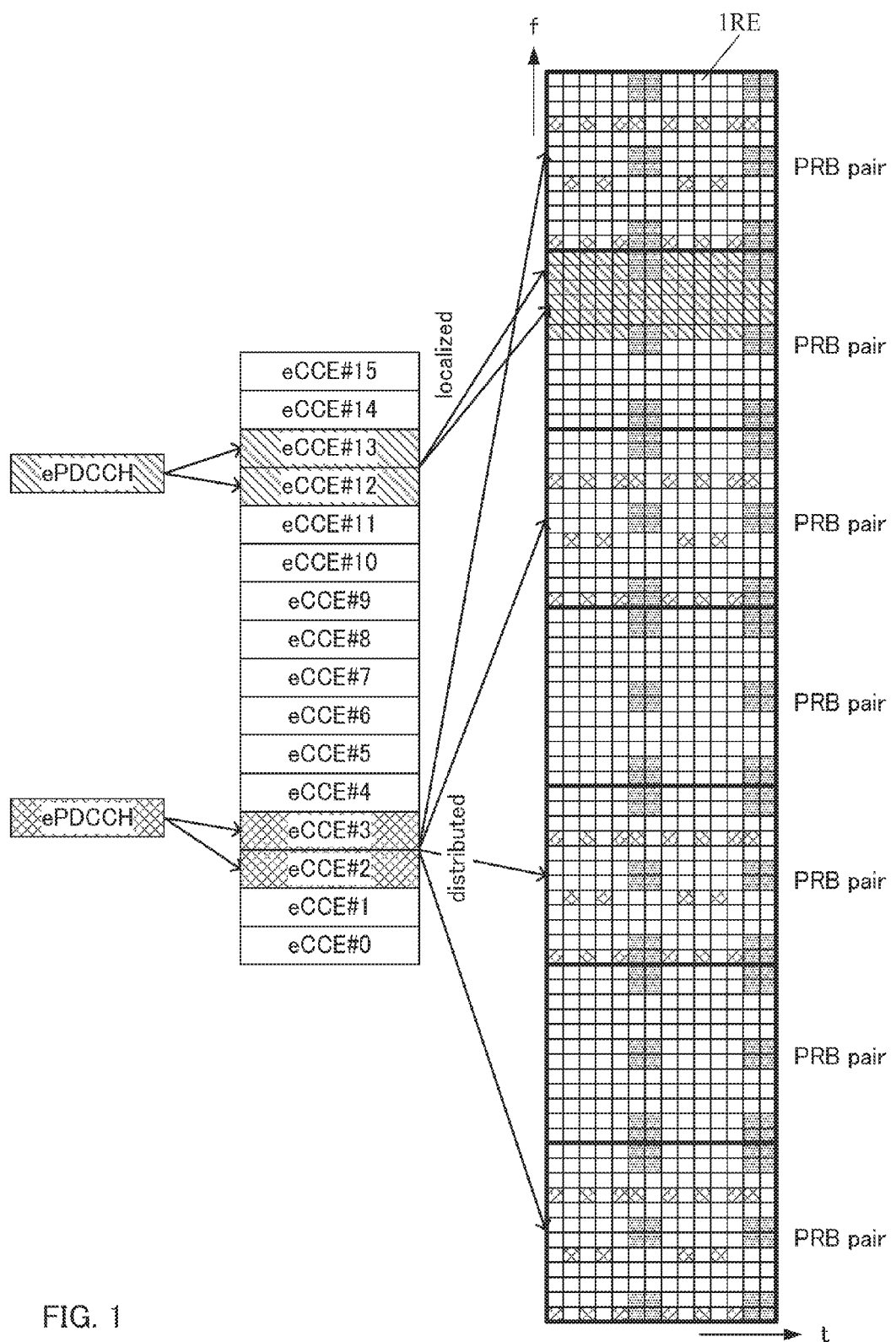
FIG. 1 is a diagram provided for describing an eCCE and a PRB pair.
Figure 2:
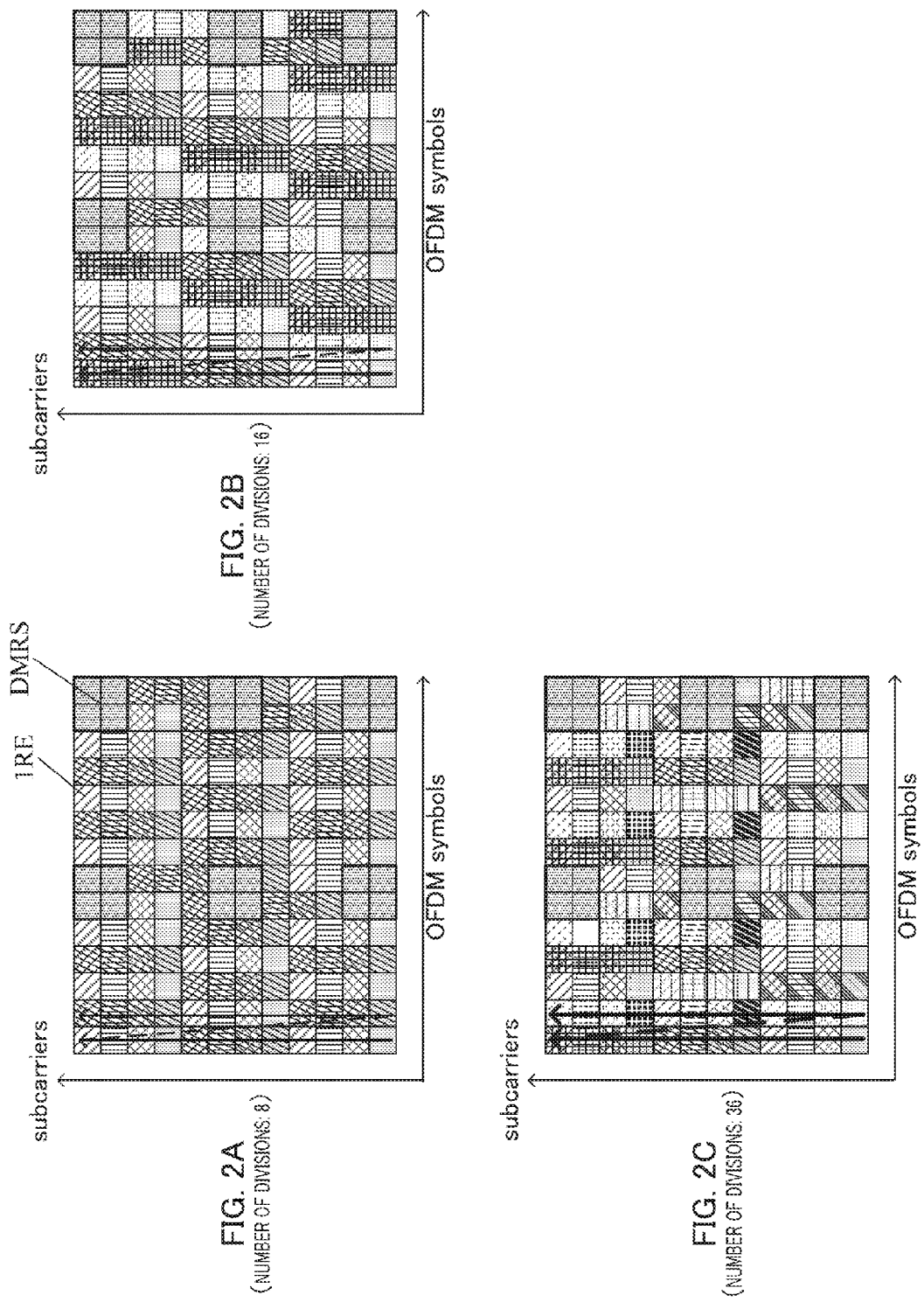
FIGS. 2A to 2C are diagrams each illustrating a configuration example of an eREG.

Embodiments of the present invention are described in detail hereunder with reference to the accompanying drawings. Throughout the embodiments, the same elements are assigned the same reference numerals, and a duplicate description of the elements is omitted.

Embodiment 1

[Communication System Overview]

A communication system according to the present embodiment has base station 100 and terminal 200. The communication system is, for example, an LTE-Advanced system. Base station 100 is, for example, a base station that supports the LTE-Advanced system, and terminal 200 is, for example, a terminal that supports the LTE-Advanced system.

Although base station 100 and terminal 200 can perform transmission and reception of control information (DL assignment or UL grant) using a PDCCH region or an ePDCCH region, in the following description, for simplification of description, only transmission and reception of control information in an ePDCCH region will be described.

Figure 5:
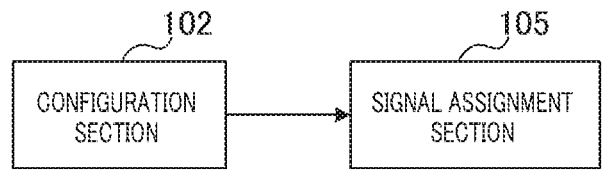
FIG. 5 is a block diagram illustrating main components of a base station according to Embodiment 1 of the present invention.

FIG. 5 is a block diagram illustrating main components of base station 100 according to the present embodiment.

In base station 100, configuration section 102 configures a first search space and a second search space as candidates, to which control information is assigned, within a data assignable region (PDSCH region) for terminal 200. Each of the first search space and the second search space includes a plurality of control channel elements (eCCEs).

Signal assignment section 105 assigns the control information (DL assignment or UL grant) to each of the first search space and the second search space configured by configuration section 102. Accordingly, the control information assigned to each of the first search space and the second search space is transmitted.

Figure 6:
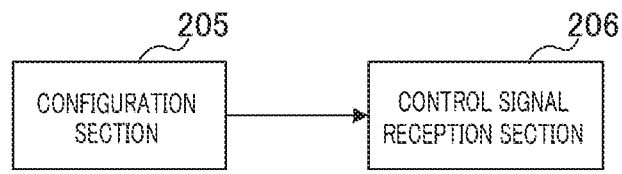
FIG. 6 is a block diagram illustrating main components of a terminal according to Embodiment 1 of the present invention.

FIG. 6 is a block diagram illustrating main components of terminal 200 according to the present embodiment.

In terminal 200, configuration section 205 configures a first search space and a second search space as candidates, to which control information is assigned, within a data assignable region (PDSCH region).

Control signal reception section 206 extracts the control information assigned to each of the first search space and the second search space configured by configuration section 205. Accordingly, the control information transmitted from base station 100 is received.

In base station 100 and terminal 200, the number (eCCE index) of a control channel element to which the control information is assigned is associated with an uplink resource (PUCCH resource) to be used to transmit a response signal to downlink data (PDCCH) on a one-to-one basis. Configuration section 102 and configuration section 205 allocate numbers to a plurality of first control channel elements included in the first search space in an ascending order, and allocate numbers larger than or identical with the numbers allocated to the plurality of first control channel elements to a plurality of second control channel elements included in the second search space.

[Configuration of Base Station 100]

Figure 7:
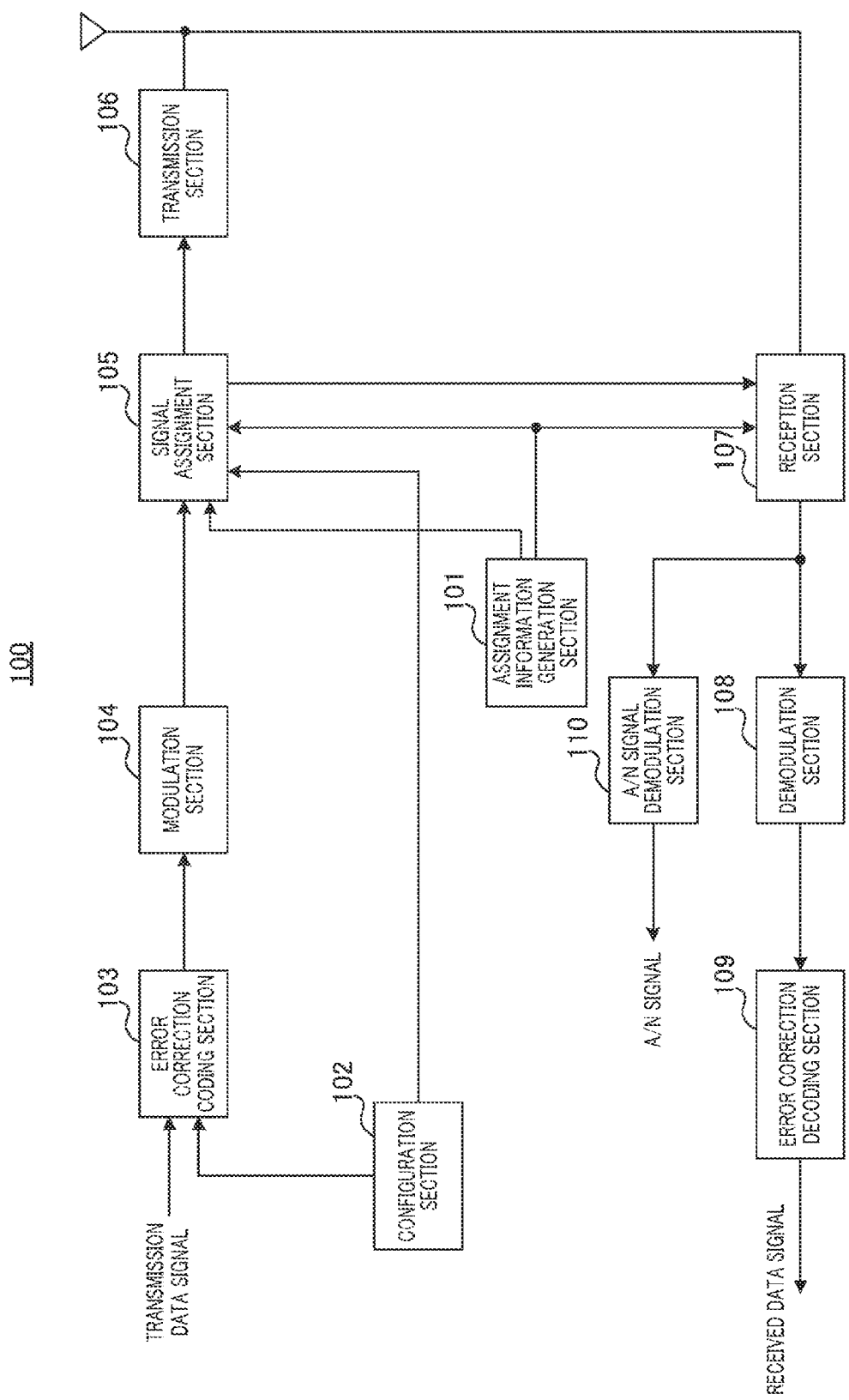
FIG. 7 is a block diagram illustrating the configuration of the base station according to Embodiment 1 of the present invention.

FIG. 7 is a block diagram illustrating the configuration of base station 100 according to the present embodiment. As illustrated in FIG. 7, base station 100 includes assignment information generation section 101, configuration section 102, error correction coding section 103, modulation section 104, signal assignment section 105, transmission section 106, reception section 107, demodulation section 108, error correction decoding section 109, and A/N signal demodulation section 110.

In a case where there is a downlink data signal (DL data signal) to be transmitted and an uplink data signal (UL data signal) to be assigned to an uplink (UL), assignment information generation section 101 determines resources (RB) to which assign the data signals are assigned, and generates assignment information (DL assignment and UL grant). The DL assignment includes information relating to assignment of the DL data signal. The UL grant includes information relating to allocated resources for the UL data signal to be transmitted from terminal 200. The DL assignment is outputted to signal assignment section 105, and the UL grant is outputted to signal assignment section 105 and reception section 107.

Configuration section 102 configures one or a plurality of ePDCCH search spaces for each terminal 200. Specifically, configuration section 102 configures a PRB pair number in which an ePDCCH search space is arranged, an eCCE index of each aggregation level, and an assignment method (localized assignment or distributed assignment) of the search space (ePDCCH) for each terminal 200. The ePDCCH search space includes a plurality of assignment candidates (ePDCCH candidates). Each "assignment candidate" includes eCCEs corresponding to the number of aggregation levels. In the localized assignment, eCCEs are obtained by dividing each PRB pair into a predetermined number of parts (for example, 4 divisions). In the distributed assignment, in order to assign eCCEs to a plurality of PRB pairs, one CCE is assigned to a plurality of eREGs (resources obtained by dividing a PRB pair) that belong to different PRB pairs.

When a plurality of ePDCCH search spaces are configured for terminal 200, configuration section 102 assigns an eCCE index to each search space. When the same PRB pair numbers are assigned to a plurality of search spaces, configuration section 102 allocates an eCCE index of a different search space to the PRB pair according to an eCCE index of a search space having a small search space number. Details of a search space configuration method in configuration section 102 will be described below.

Configuration section 102 outputs information relating to a configured search space (hereinafter, may also be referred to as "search space information") to signal assignment section 105. The search space information includes, for example, the PRB pair number, the eCCE index, the ePDCCH assignment method, and the like. Configuration section 102 outputs information regarding the PRB pair configured in the search space and information regarding the ePDCCH assignment method to error correction coding section 103 as control information. When the localized assignment or the distributed assignment is configured in advance as the ePDCCH assignment method, information regarding the ePDCCH assignment method is not required.

Error correction coding section 103 receives a transmission data signal (DL data signal) and control information received from configuration section 102 as input signals, performs error correction coding on the input signals, and outputs the processed signals to modulation section 104.

Modulation section 104 modulates the signals received from error correction coding section 103, and outputs the modulated data signal to signal assignment section 105.

Signal assignment section 105 assigns the assignment information (DL assignment and UL grant) received from assignment information generation section 101 to any CCE among eCCEs (eCCEs in assignment candidate units) corresponding to a PRB pair number indicated by search space information received from configuration section 102. Signal assignment section 105 also assigns the data signal received from modulation section 104 to a downlink resource corresponding to the assignment information (DL assignment) received from assignment information generation section 101.

A transmission signal is formed by assignment information and a data signal being assigned to predetermined resources in this manner. The thus-formed transmission signal is outputted to transmission section 106. Signal assignment section 105 notifies reception section 107 of an eCCE index of an eCCE used to transmit the DL assignment.

Transmission section 106 executes radio transmission processing such as up-conversion on the input signal, and transmits the obtained signal to terminal 200 via an antenna.

Reception section 107 receives a signal transmitted from terminal 200 via an antenna, and outputs the received signal to demodulation section 108. More specifically, reception section 107 separates a signal corresponding to a resource indicated by a UL grant received from assignment information generation section 101 from the received signal, and executes reception processing such as down-conversion on the separated signal and thereafter outputs the obtained signal to demodulation section 108. Reception section 107 separates a signal that corresponds to a PUCCH resource associated with an eCCE index received from signal assignment section 105 and outputs the separated signal to A/N signal demodulation section 110.

Demodulation section 108 executes demodulation processing on the input signal, and outputs the obtained signal to error correction decoding section 109.

Error correction decoding section 109 decodes the input signal to obtain the received data signal from terminal 200.

A/N signal demodulation section 110 performs modulation processing on the signal received from reception section 107, performs A/N determination processing (determination on ACK or NACK) on the obtained A/N signal, and outputs the determination result.

[Configuration of Terminal 200]

Figure 8:
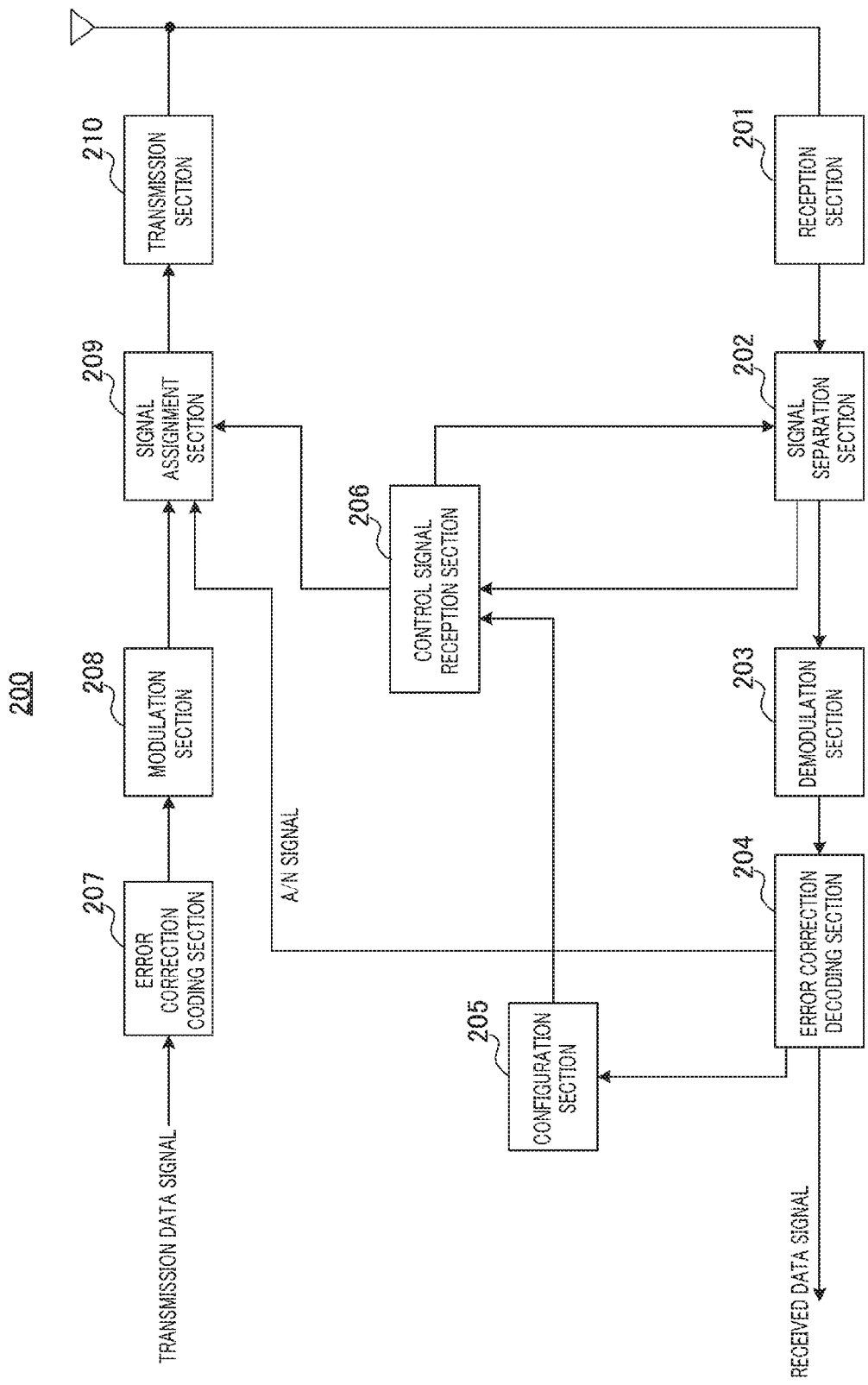
FIG. 8 is a block diagram illustrating the configuration of the terminal according to Embodiment 1 of the present invention.

FIG. 8 is a block diagram illustrating the configuration of terminal 200 according to the present embodiment. As illustrated in FIG. 8, terminal 200 includes reception section 201, signal separation section 202, demodulation section 203, error correction decoding section 204, configuration section 205, control signal reception section 206, error correction coding section 207, modulation section 208, signal assignment section 209, and transmission section 210.

Reception section 201 receives a signal transmitted from base station 100 via an antenna, and after executing reception processing such as down-conversion thereon, outputs the processed signal to signal separation section 202.

Signal separation section 202 extracts a control signal relating to resource allocation from the reception signal received from reception section 201, and outputs the extracted signal to control signal reception section 206. Signal separation section 202 also extracts from the reception signal a signal corresponding to a data resource (that is, a DL data signal) indicated by the DL assignment output from control signal reception section 206, and outputs the extracted signal to demodulation section 203.

Demodulation section 203 demodulates the signal outputted from signal separation section 202, and outputs the demodulated signal to error correction decoding section 204.

Error correction decoding section 204 decodes the demodulated signal outputted from demodulation section 203, and outputs the obtained received data signal. In particular, error correction decoding section 204 outputs "information relating to PRB pairs configured in a search space" transmitted as a control signal from base station 100, to configuration section 205. Error correction decoding section 204 determines whether or not an error is included in a received data signal after decoding using CRC (Cyclic Redundancy Check) and generates an A/N signal that represents the determination result (ACK or NACK). The A/N signal is output to signal assignment section 209.

Configuration section 205 identifies a search space configured for terminal 200 of configuration section 205 that uses an ePDCCH. For example, first, based on information received from error correction decoding section 204, configuration section 205 identifies PRB pairs to be configured in the search space. Next, configuration section 205 determines an eCCE index of a search space corresponding to the PRB pairs. At this time, when a plurality of ePDCCH search spaces are configured, configuration section 205 allocates an eCCE index to each search space. When the same PRB pair number is assigned to a plurality of search spaces, configuration section 205 allocates a CCE index of a different search space to the PRB pair according to an eCCE index of a search space having a small search space number. Configuration section 205 identifies which eCCE index is configured in an ePDCCH candidate for each aggregation level according to a common rule between base station 100 defined for each terminal 200 in advance and terminal 200. For example, configuration section 205 determines an eCCE index as an ePDCCH candidate of each aggregation level based on a UE ID (an ID of an individual terminal). Next, search space configuration section 205 outputs information relating to PRB pairs and CCEs configured as the search space to control signal reception section 206. The details of a search space configuration method in configuration section 205 will be described below in detail.

In a signal component received from signal separation section 202, control signal reception section 206 detects a control signal (DL assignment or UL grant) intended for terminal 200 of signal separation section 202 by performing blind decoding with respect to CCEs corresponding to PRB pairs indicated by information received from configuration section 205. That is, control signal reception section 206 receives a control signal assigned to one assignment candidate among a plurality of assignment candidates forming a search space configured by configuration section 205. Control signal reception section 206 outputs a detected DL assignment intended for terminal 200 of control signal reception section 206 to signal separation section 202, and outputs a detected UL grant intended for terminal 200 thereof to signal assignment section 209. Control signal reception section 206 outputs an eCCE index of an eCCE with the detected DL assignment to signal assignment section 209.

When a transmission data signal (UL data signal) is inputted to error correction coding section 207, error correction coding section 207 performs error correction coding on the transmission data signal and outputs the obtained signal to modulation section 208.

Modulation section 208 modulates the signal received from error correction coding section 207, and outputs the modulated signal to signal assignment section 209.

Signal assignment section 209 assigns the signal outputted from modulation section 208 according to the UL grant received from control signal reception section 206, and outputs the obtained signal to transmission section 210. Signal assignment section 209 assigns the A/N signal received from error correction decoding section 204 to a predetermined resource. Specifically, when there is a transmission data signal, signal assignment section 209 multiplexes the A/N signal to the transmission data signal, and outputs the obtained signal to transmission section 210. When there is no transmission data signal, signal assignment section 209 identifies a PUCCH resource based on an eCCE index received from control signal reception section 206, assigns the A/N signal to the identified PUCCH resource, and outputs the A/N signal to transmission section 210.

Transmission section 210 executes transmission processing such as up-conversion on the input signal, and transmits the obtained signal.

[Operations of Base Station 100 and Terminal 200]

Operations of base station 100 and terminal 200 that have the above configurations will be described.

Base station 100 and terminal 200 configure a plurality of search spaces (for example, search space 1 and search space 2) as candidates, to which a control signal addressed to terminal 200 is assigned, in an ePDCCH region for one terminal 200. At this time, base station 100 and terminal 200 allocate eCCE indexes (numbers) to a plurality of eCCEs included in the search space 1 in an ascending order, and allocate numbers larger than a plurality of eCCE indexes of the search space 1 to a plurality of eCCEs included in the search space 2.

Figure 3:
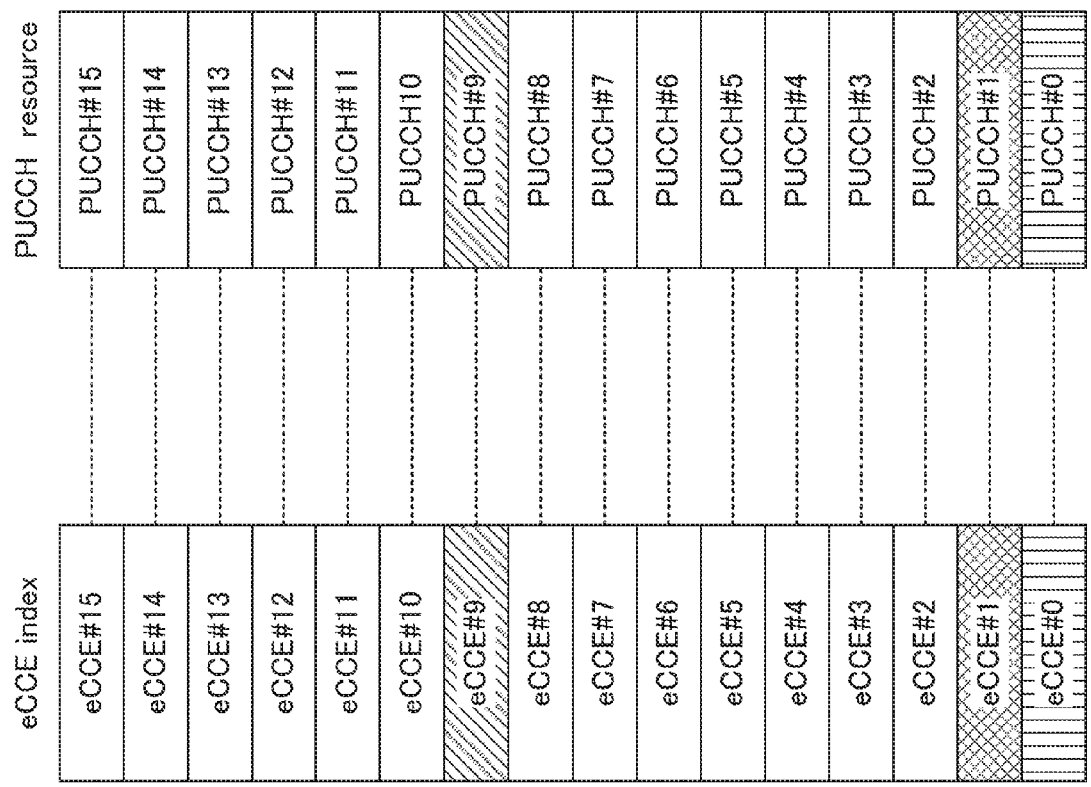
FIG. 3 is a diagram illustrating association of eCCE indexes and PUCCH resources.

As described above, the eCCE indexes to which the control information are assigned are associated with the PUCCH resources to be used to transmit the A/N signal to downlink data indicated to assign by the control information on a one-to-one basis (see FIG. 3).

The search space 1 is a search space that is often shared between terminals 200. For example, the search space 1 is a search space (common search space described above) that is often shared between a plurality of terminals 200. The search space 1 and the search space 2 are UE specific search spaces that are individually configured in respective terminals 200, and the search space 1 is a search space (search space to be primarily used) with priority over the search space 2. When terminal 200 performs communication using a plurality of CCs having PCell and SCell, the search space 1 is a search space to which control information for PCell is assigned, and the search space 2 is a search space to which control information for SCell is assigned.

Figure 9:
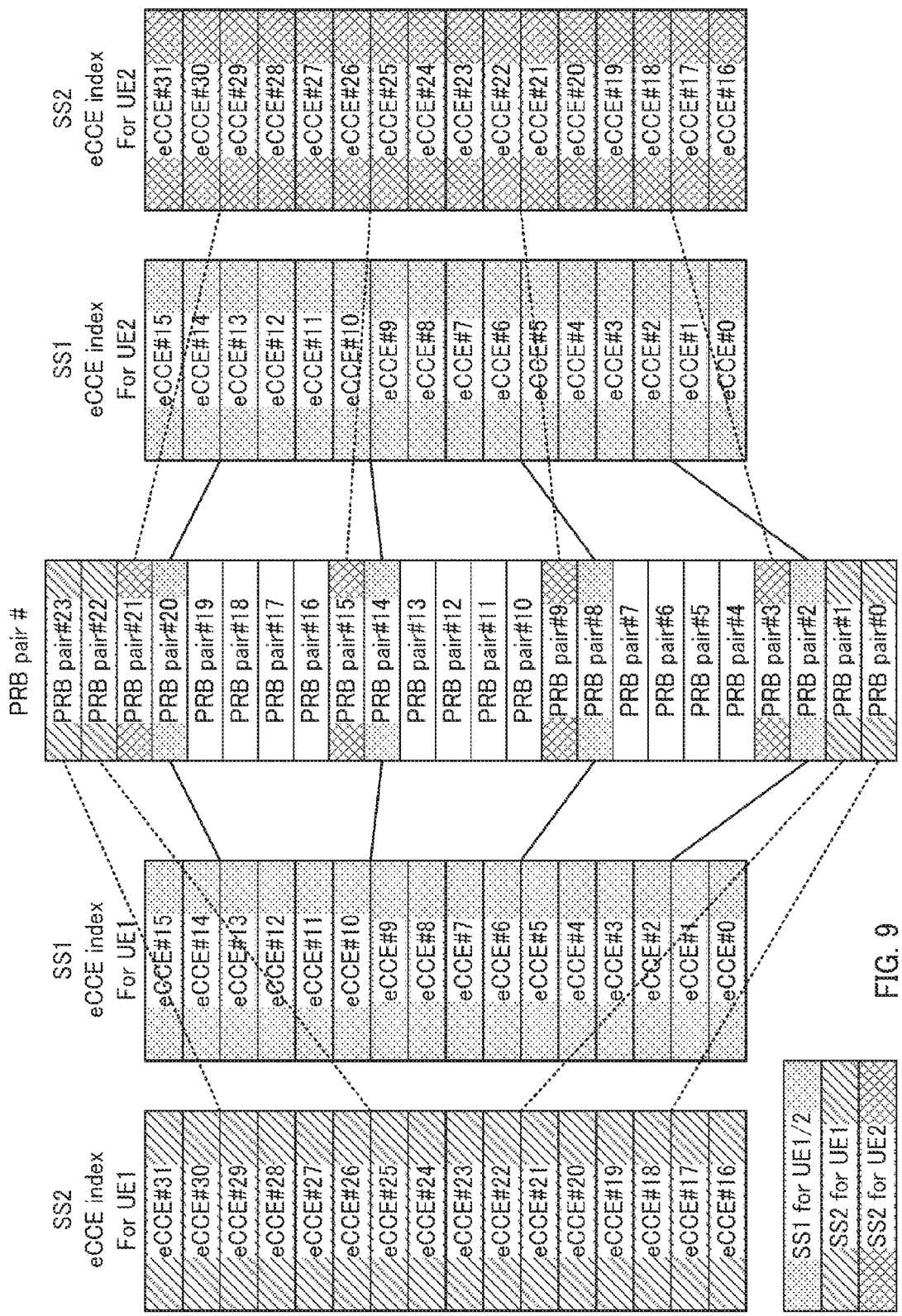
FIG. 9 is a diagram illustrating a search space configuration example according to Embodiment 1 of the present invention.

FIG. 9 illustrates a search space configuration method in the present embodiment. In FIG. 9, similarly to FIG. 4, localized assignment is applied to an ePDCCH, and a search space 1 (SS1) and a search space 2 (SS2) are respectively configured in terminals 200 (UE1 and UE2). The search space 1 is shared by UE1 and UE2 and is assigned to PRB pairs #2, #8, #14, and #20. The search space 2 of UE1 is assigned to PRB pairs #0, #1, #22, and #23, and the search space 2 of UE2 is assigned to PRB pairs #3, #9, #15, and #21. However, each terminal 200 recognizes only the search space of terminal 200. In FIG. 9, four eCCEs are assigned per PRB pair.

Base station 100 and each terminal 200 (UE1 and UE2) first determine the eCCE indexes of the search space 1 among the search spaces configured in respective terminal 200, and then determine the eCCE indexes of the search space 2. That is, base station 100 and each terminal 200 first allocate the eCCE indexes in an ascending order of the PRB pair numbers corresponding to the search space 1, and then allocate the eCCE indexes in an ascending order of the PRB pair numbers corresponding to the search space 2.

Accordingly, UE1 and UE2 first allocate eCCE #0 to eCCE #15 to the search space 1. With this, eCCE #0 to eCCE #15 are assigned in an order of the PRB pairs #2, #8, #14, and #20 corresponding to the search space 1.

Next, UE1 and UE2 allocate eCCE #16 to eCCE #31 to the search space 2. With this, eCCE #16 to eCCE #31 are assigned in an order of the PRB pairs #0, #1, #22, and #23 corresponding to the search space 2 of UE1. Furthermore, eCCE #16 to eCCE #31 are assigned in an order of PRB pairs #3, #9, #15, and #21 corresponding to the search space 2 of UE2. That is, UE1 and UE2 allocate the eCCE indexes larger than the eCCE indexes of the search space 1 to the search space 2.

In this way, in the search space 1 that is shared by both UE1 and UE2, the eCCE indexes of the eCCEs that are assigned to PRB pairs #2, #8, #14, and #20 are the same between UE1 and UE2. That is, in the search space 1, since the association of the PRB pair numbers and the eCCE indexes matches each other in UE1 and UE2, and the use of eCCEs in UE1 and UE2 matches the use of the PUCCH resource associated with the eCCE indexes. Accordingly, by taking into consideration only collision of the eCCEs, base station 100 can assign an ePDCCH addressed to UE1 and an ePDCCH for UE2 to the shared search space 1 while avoiding collision of the PUCCH resources between UE1 and UE2, thereby facilitating scheduling.

As described above, in the present embodiment, when a plurality of search spaces are configured for each terminal 200, the eCCE indexes that are continuous within the search space are allocated to at least one search space (search space 1). With this, even the search space configuration is recognized between terminals 200, the same eCCE index is easily allocated to the same (common) search space between terminals 200. In other words, different eCCE indexes are not easily allocated to the same (common) search space between terminals 200.

Figure 4:
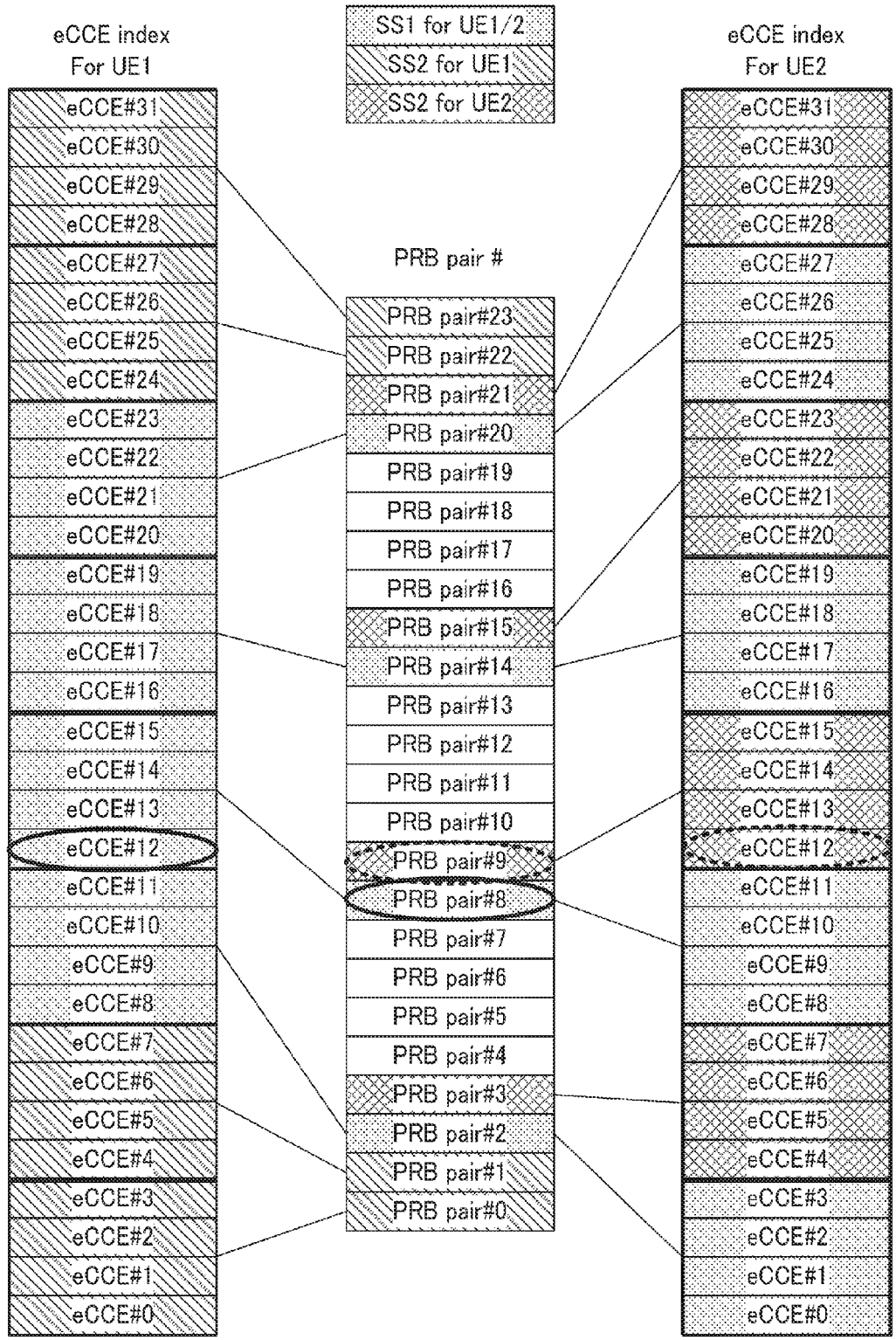
FIG. 4 is a diagram provided for describing a problem in a correspondence relationship of an eCCE index and a PRB pair between a plurality of terminals.

As described above, if different eCCE indexes are allocated to a search space that is shared between terminals 200, the correspondence relationship of the eCCE indexes and the PRB pairs varies for each terminal 200, and collision of the PUCCH resources and an increase in the number of required resources occur (for example, see FIG. 4).

In contrast, in the present embodiment, the continuous eCCE indexes are allocated to at least one search space (search space 1), and the eCCE indexes larger than the eCCE indexes of at least one search space are allocated to the other search space (search space 2). With this, the correspondence of the eCCE indexes and the PRB pairs in the search space 1 matches between terminals 200 that shares the search space 1 regardless of the assignment of the eCCE indexes of the other search space 2. That is, in regard to the search space 1, collision of the eCCE indexes and collision of the PUCCH resources are aligned. Accordingly, base station 100 performs scheduling taking into consideration only collision of the eCCE indexes between terminals 200. Therefore, it is possible to avoid collision of the PUCCH resources between terminals 200.

Since collision of the eCCEs and collision of the PUCCH resources in the search space 1 match each other between terminals 200, the number of PUCCH resources required for the search space 1 does not become larger than the number of eCCE indexes of the search space 1. That is, it is possible to limit an increase in the number of PUCCH resources.

Accordingly, according to the present embodiment, even when a plurality of search spaces are configured with respect to an ePDCCH for a single terminal, it is possible to avoid collision of the PUCCH resources between the terminals while limiting an increase in the number of PUCCH resources.

If different eCCE indexes are allocated to a search space that is shared between terminals 200, the eCCE indexes corresponding to the same PRB pair may vary between terminals 200. For example, in FIG. 4, while the eCCE indexes corresponding to PRB pair #20 are eCCEs #20 to #23 in UE1, in UE2, the eCCE indexes corresponding to PRB pair #20 are eCCEs #24 to #27. In this case, if eCCE #20 is used in an ePDCCH for UE1, since the PUCCH resource associated with eCCE #20 is used, if eCCE #20 is used for UE2, collision of the PUCCH resources occurs. If eCCE #20 is used in an ePDCCH for UE1, eCCE #24 cannot be used in an ePDCCH for UE2 that is assigned to the same PRB pair #20. For this reason, the PUCCH resource associated with eCCE #24 is not used and wasted. That is, in FIG. 4, there are a plurality of eCCE indexes that cannot be simultaneously used between terminals 200.

In contrast, in the present embodiment, as described above, the correspondence of the eCCE indexes and the PRB pairs in the search space 1 matches between terminals 200 that shares the search space 1. Accordingly, according to the present embodiment, there is no combination of the eCCE indexes which cannot be simultaneously used between terminals 200.

According to the present embodiment, the eCCE indexes for the search space 1 are aligned in the terminal 200, and in regard to the eCCE indexes for the search space 2 of each terminal 200, the eCCE indexes different from the eCCE indexes for the search space 1 are allocated. Accordingly, it is possible to avoid collision of the eCCEs of the search space 1 and the search space 2 between terminals 200.

According to the present embodiment, even if the search space 1 that is configured in each terminal 200 is not notified to other terminals 200, the search space 1 to which the same eCCE index is allocated can be shared between terminals 200.

Embodiment 2

In the present embodiment, a case where some of a plurality of search spaces configured in one terminal 200 is assigned to the same PRB pair in an overlapping manner will be described. A base station and a terminal according to the present embodiment share the same basic configuration as base station 100 and terminal 200 according to Embodiment 1. Accordingly, description will be provided referring back to FIGS. 7 and 8.

A study has been carried out on varying an eCCE to be used in an ePDCCH candidate according to an aggregation level. Accordingly, within a search space, all eCCEs corresponding to a PRB pair number indicated from a higher layer are not used as ePDCCH candidate. Therefore, the same PRB pair is shared between a plurality of search spaces, and a plurality of eCCEs corresponding to different resources within the same PRB pair are added as an ePDCCH candidate, thereby reducing the probability (blocking probability) of collision against the eCCEs of other terminals 200 while maintaining the number of ePDCCH candidates for terminal 200. The same PRB pair is shared between a plurality of search spaces, thereby reducing the total number of PRB pairs that are assigned to the search space of the ePDCCH and securing a larger number of PUSCH regions. For this reason, throughput in the uplink can be improved.

In the present embodiment, when some of a plurality of search spaces configured for one terminal 200 is assigned to the same PRB pair in an overlapping manner, in the PRB pair to which a plurality of search spaces are assigned, the eCCE indexes of other search spaces are allocated according to the eCCE index of a search space having a small search space number. For example, when the search space 1 and the search space 2 are assigned to the same PRB pair with respect to terminal 200, in the PRB pair, the eCCE index of the search space 2 become identical with the eCCE index of the search space 1.

Figure 10:
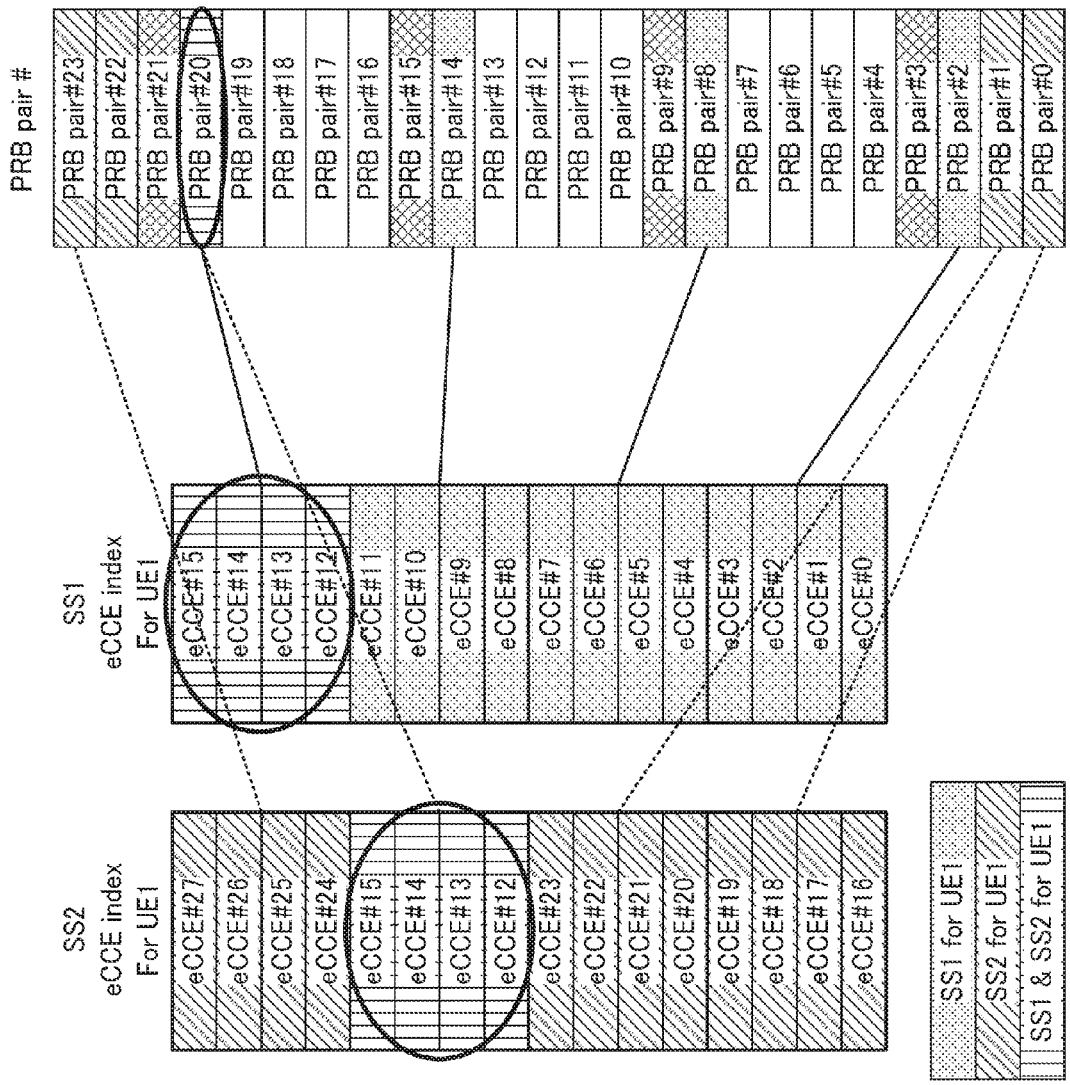
FIG. 10 is a diagram illustrating a search space configuration example according to Embodiment 2 of the present invention.

FIG. 10 illustrates an assignment example of eCCEs when the search space 1 (SS1) and the search space 2 (SS2) are configured for one terminal 200. In FIG. 10, PRB pair #20 is assigned in common to the search space 1 and the search space 2. In FIG. 10, similarly to FIG. 9, base station 100 and terminal 200 allocate the eCCE indexes (eCCEs #0 to #15) in an ascending order in the search space 1. Accordingly, in the search space 1, eCCEs #12 to #15 are assigned to PRB pair #20.

Base station 100 and terminal 200 allocate eCCE indexes #12 to #15 as the eCCE indexes corresponding to PRB pair #20 in the search space 2 according to the eCCE indexes of the search space 1. Terminal 200 allocates the eCCE indexes other than the eCCE indexes corresponding to PRB pair #20 in the search space 2 in an ascending order. Accordingly, in the search space 2, eCCE #16 to eCCE #26 are assigned to PRB pairs #0 and #1, eCCEs #12 to #15 are assigned to PRB pair #20, and eCCEs #24 to #27 are assigned to PRB pair #23.

That is, base station 100 and terminal 200 allocate the same eCCE indexes as specific eCCEs to eCCEs, which are assigned to the same PRB pair as specific eCCEs among a plurality of eCCEs of the search space 1, among a plurality of eCCEs of the search space 2. Base station 100 and terminal 200 allocate the eCCE indexes larger than the eCCE indexes of the search space 1 to the eCCEs other than the eCCEs, to which the same eCCE indexes as the specific eCCEs are allocated, in the search space 2.

With this, as in Embodiment 1 (FIG. 9), it is possible to reduce the total number of eCCE indexes to be configured in terminal 200 while matching the eCCE indexes in the search space 1 (that is, a search space that is easily shared with other terminals 200) between terminals 200 that share the search space 1. For example, in Embodiment 1 (FIG. 9), while 32 eCCE indexes are allocated to UE1, in the present embodiment (FIG. 10), 28 eCCE indexes are allocated to UE1. That is, in FIG. 10, it is possible to reduce the number of eCCE indexes to be used in UE1 by four compared to FIG. 9. Accordingly, since it is possible to reduce the number of PUCCH resources that are associated with the eCCEs, throughput in the uplink is improved.

According to the present embodiment, as the PRB pair is shared by the search space 1 and the search space 2, it is possible to reduce the PRB pairs that are assigned as a search space for terminal 200. For example, in Embodiment 1 (FIG. 9), while 8 PRB pairs are assigned to UE1, in the present embodiment (FIG. 10), 7 PRB pairs smaller than in Embodiment 1 by one are assigned to UE1. Accordingly, in the present embodiment, since it is possible to secure a larger number of PUSCH regions compared to Embodiment 1, throughput in the uplink is improved.

Figure 11:
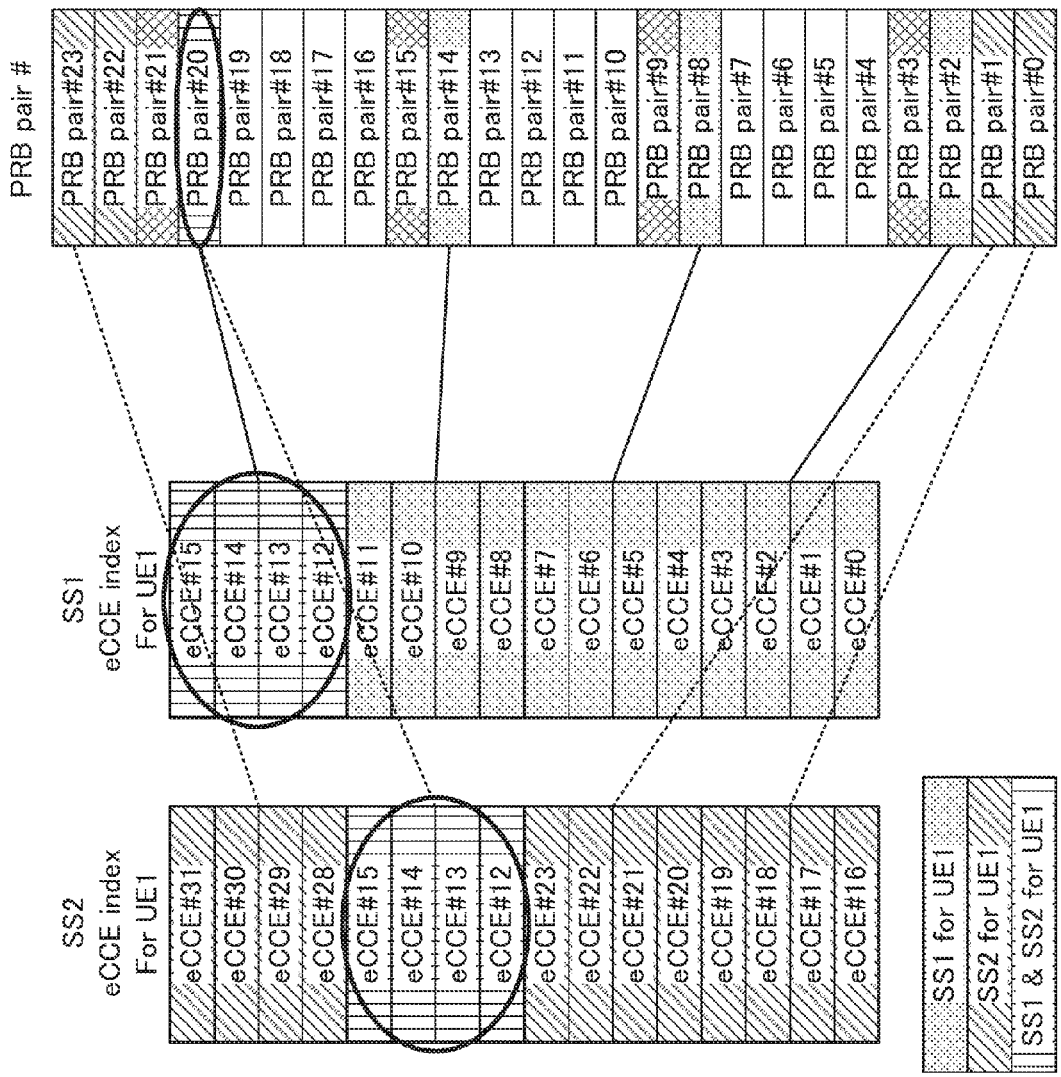
FIG. 11 is a diagram illustrating another search space configuration example according to Embodiment 2 of the present invention.

Instead of the eCCE assignment illustrated in FIG. 10, base station 100 and terminal 200 may allocate the eCCE indexes for the search space 1 and the search space 2 in the same manner as FIG. 9, and then may change only the eCCE indexes in the search space 2 corresponding to the PRB pair assigned in common to both search spaces to the eCCE indexes of the search space 1. For example, as illustrated in FIG. 11, first, eCCEs #16 to #31 are allocated to the search space 2 in an ascending order in the same manner as FIG. 9. Next, only portions of eCCEs #24, #25, #26, and #27 corresponding to PRB pair #20 are changed to eCCEs #12, #13, #14, and #15 corresponding to PRB pair #20 of the search space 1.

With this, in terminal 200, the PUCCH resources corresponding to eCCEs #24, 25, 26, and 27 are not used without depending on the ePDCCH assignment. Accordingly, for example, base station 100 easily assigns the PUCCH resources corresponding to eCCEs #24, #25, #26, and #27 as explicit PUCCH resources. The explicit PUCCH resources are PUCCH resources that are indicated in advance by higher layer signaling, and are PUCCH resources that are used instead of implicit resources during channel selection, for a relay terminal, or the like when cross carrier scheduling is not performed at the time of CA application.

In the search space 2, the eCCE indexes corresponding to the PRB pair assigned in common with the search space 1 may not be changed to the eCCE indexes of the search space 1 (for example, may be the same as the eCCE indexes of FIG. 9), and only the association of the eCCE indexes and the PUCCH resources may be the same in the search space 1 and the search space 2. For example, the PUCCH resources associated with eCCEs #24, #25, #26, and #27 corresponding to PRB pair #20 in common with the search space 1 among eCCEs #16 to #32 assigned to the search space 2 may be the same as the PUCCH resources associated with eCCEs #12, #13, #14, and #15 corresponding to PRB pair #20 of the search space 1.

Embodiment 3

In the present embodiment, a case where distributed assignment is applied to an ePDCCH will be described. A base station and a terminal according to the present embodiment share the same basic configuration as base station 100 and terminal 200 according to Embodiment 1. Accordingly, description will be provided referring back to FIGS. 7 and 8.

In the distributed assignment, an eCCE is assigned to a plurality of PRB pairs. Specifically, one eCCE is assigned to a plurality of eREGs (resources obtained by dividing a PRB pair) that belong to different PRB pairs. The number of divisions (the number of eREGs per PRB pair) of a PRB pair may be 8, 12, 16, 24, 36, and the like. When the size of a resource to which one eCCE is assigned corresponds to a resource that is obtained by dividing a PRB pair into four parts, and when a PRB pair is divided into 8, 12, 16, 24, and 36 parts, one eCCE may be divided into 2, 3, 4, 6, and 9 parts and assigned to different PRB pairs corresponding to the number of divisions of the eCCE distributed assignment in a distributed manner. The number of divisions of the eCCE may be referred to as an eCCE diversity order.

Figure 12:
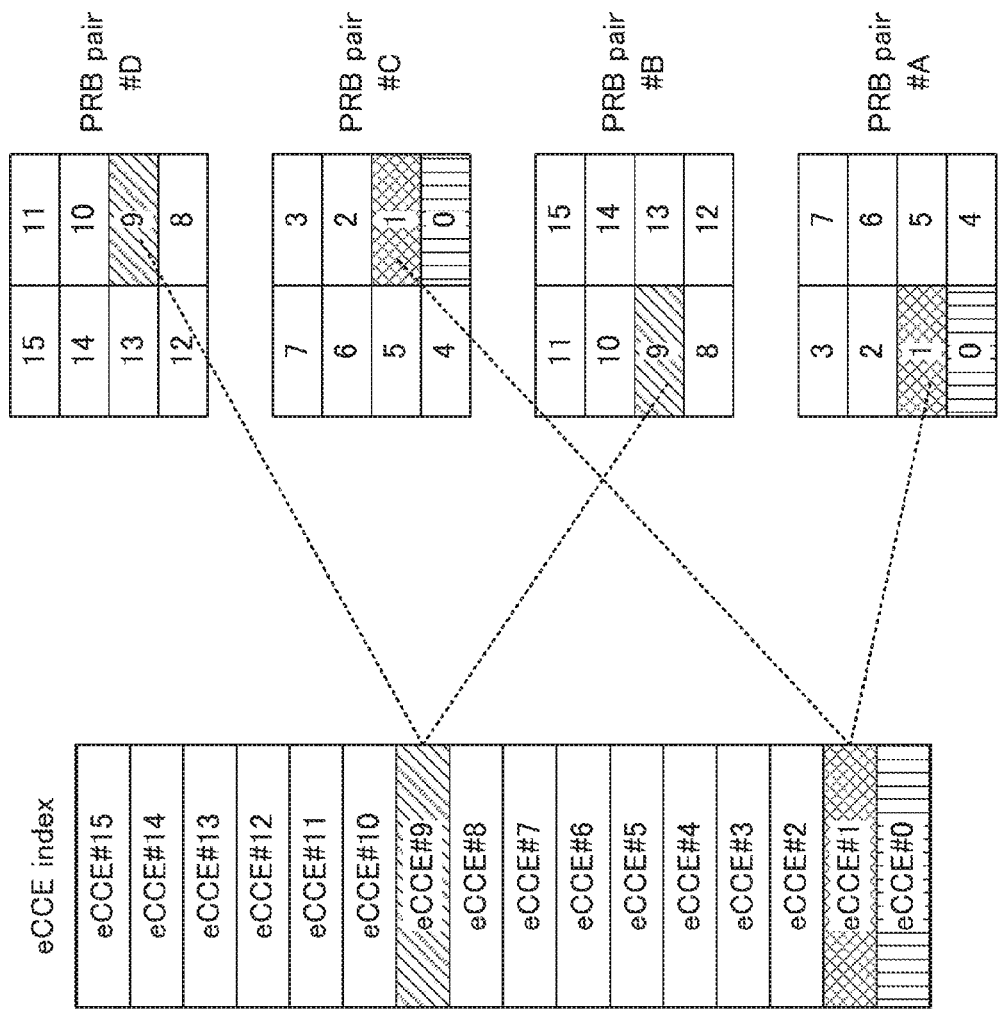
FIG. 12 is a diagram illustrating an example of distributed assignment of an ePDCCH (the number of divisions of a PRB pair: 8)

For example, as illustrated in FIG. 12, when a PRB pair is divided into 8 parts, the number of eREGs per PRB pair is 8, and one eCCE is divided into two parts and assigned to two eREGs of different PRB pairs. In FIG. 12, distributed assignment is made to two PRB pairs in units of eCCEs #N to #N+7 (in FIG. 12, N=0, 8) in a distributed manner. For example, as illustrated in FIG. 12, eCCEs #0 to #7 are assigned to PRB pair #A and PRB pair #C, eCCEs #8 to #15 are assigned to PRB pair #B and PRB pair #D.

Figure 13:
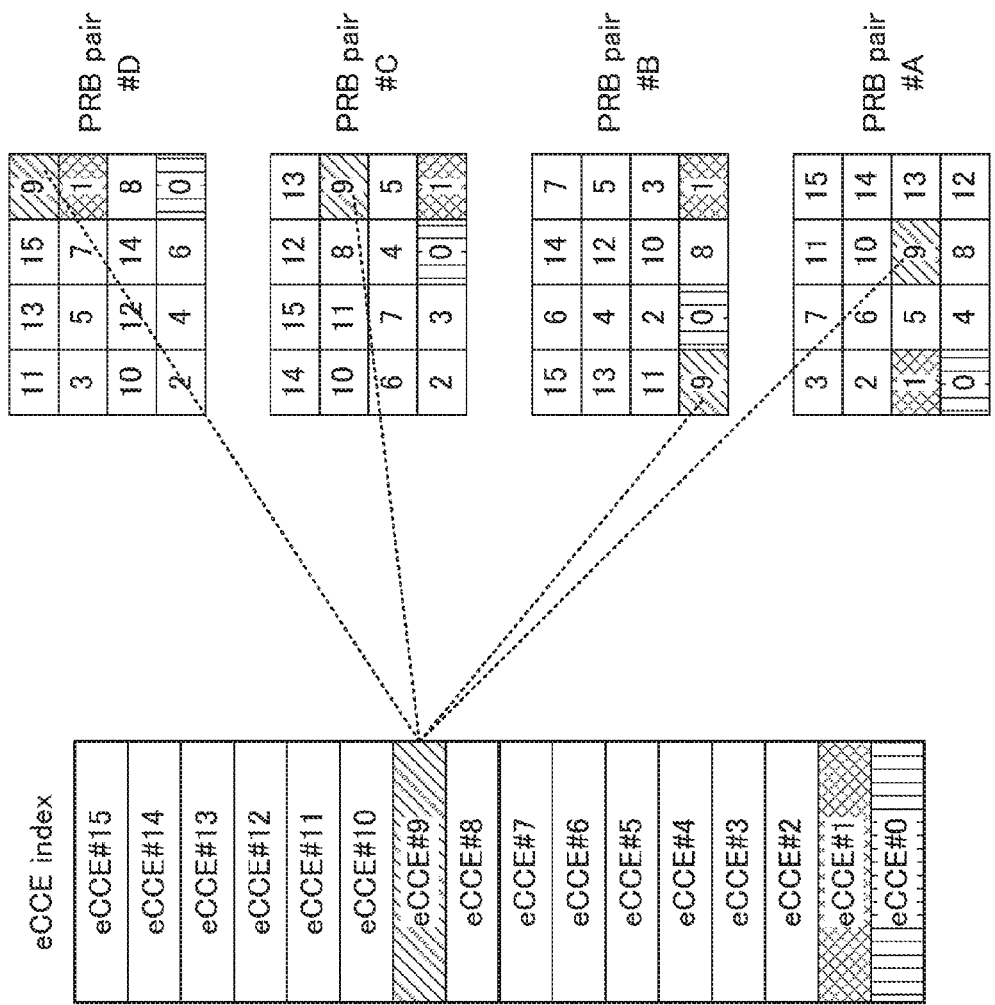
FIG. 13 is a diagram illustrating an example of distributed assignment of an ePDCCH (the number of divisions of a PRB pair: 16)

Similarly, for example, as illustrated in FIG. 13, when a PRB pair is divided into 16 parts, the number of eREGs per PRB pair is 16, and one eCCE is divided into 4 parts and assigned to four eREGs of different PRB pairs. In FIG. 13, distributed assignment is made to four PRB pairs in units of eCCEs #N to #N+15 (in FIG. 13, N=0). For example, as illustrated in FIG. 13, eCCEs #0 to #15 are assigned to PRB pairs #A, #B, #C, and #D.

As described above, in the distributed assignment, one eCCE is assigned to a plurality of PRB pairs. As in Embodiment 1, a plurality of search spaces (search space 1 and search space 2) may be configured for one terminal 200, and as in Embodiment 2, the same PRB pair may be assigned in common among a plurality of search spaces configured in one terminal 200. Accordingly, in the present embodiment, when there is a PRB pair assigned to the search space 1 and the search space 2 in an overlapping manner among a plurality of PRB pairs to which any eCCE of each search space is assigned, base station 100 and terminal 200 makes the eCCE indexes of the search space 2 corresponding to the PRB pair the same as the eCCE indexes of the search space 1.

Hereinafter, as an example, a search space configuration method when the number of divisions of a PRB pair is 8 (eCCE diversity order: 2) and 16 (eCCE diversity order: 4) will be described referring to FIGS. 14 and 15.

Figure 14:
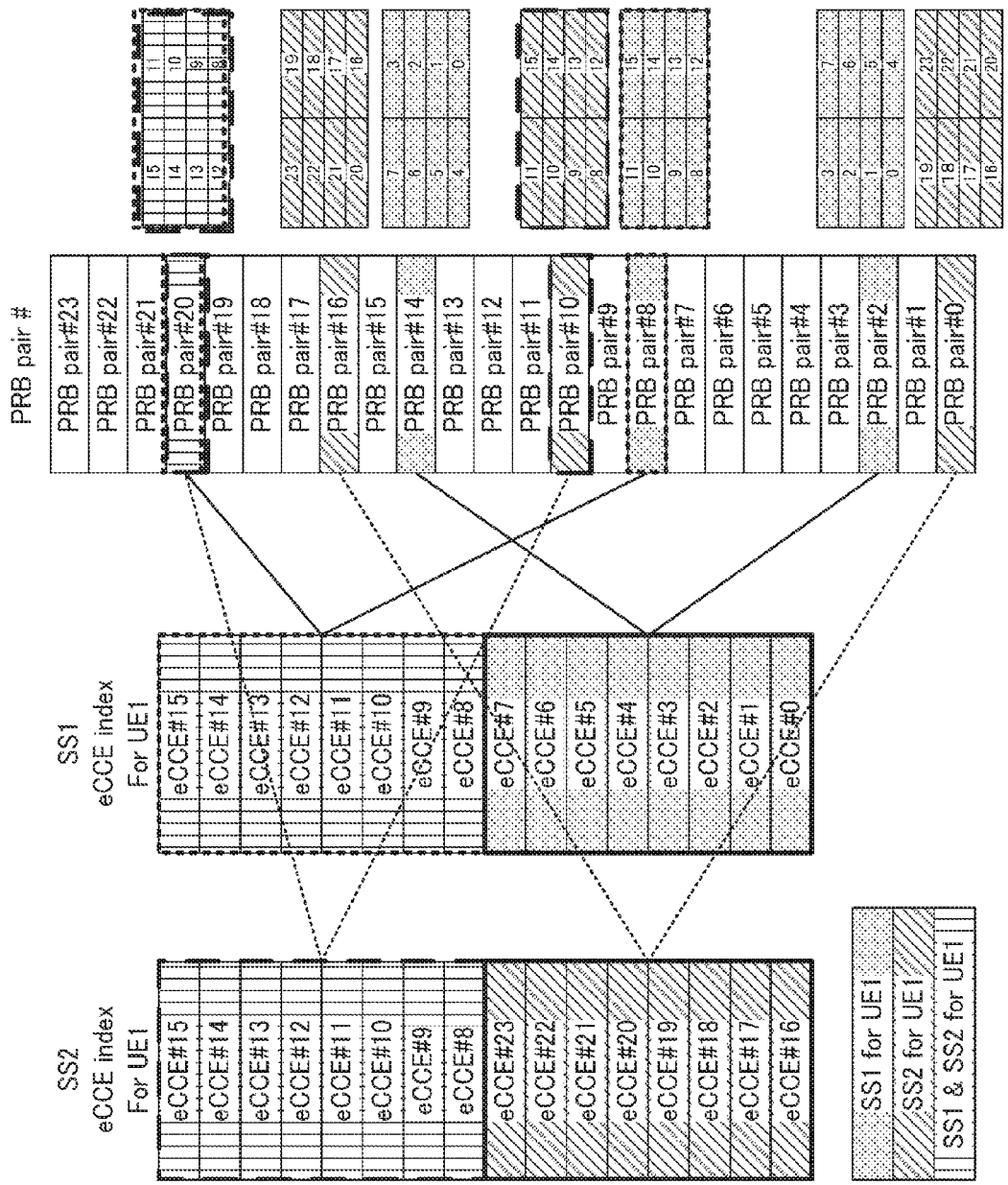
FIG. 14 is a diagram illustrating a search space configuration example according to Embodiment 3 of the present invention (the number of divisions of a PRB pair: 8)
Figure 15:
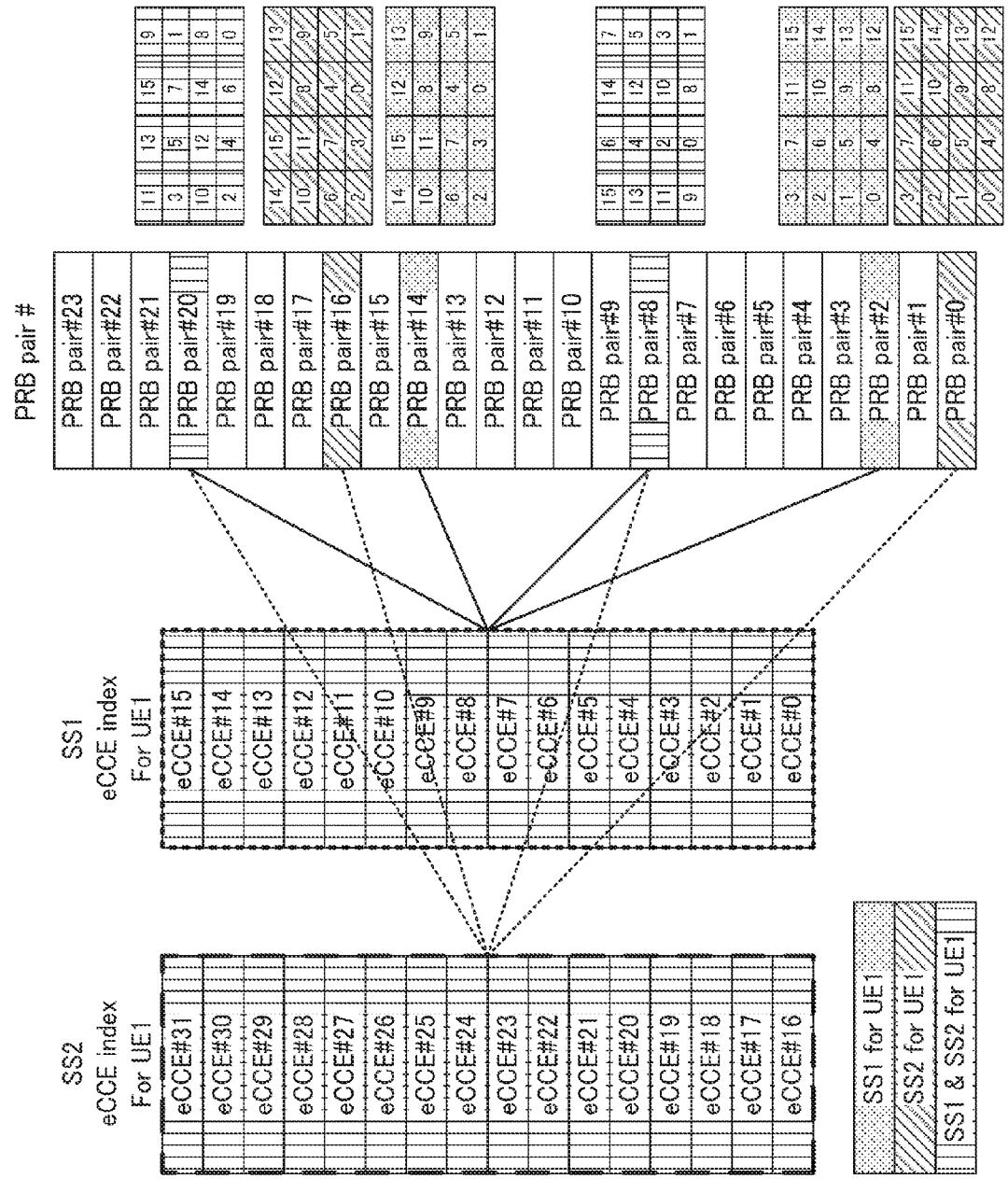
FIG. 15 is a diagram illustrating a search space configuration example according to Embodiment 3 of the present invention (the number of divisions of a PRB pair: 16)

In FIGS. 14 and 15, a search space 1 (SS1) and a search space 2 (SS2) are configured in UE1.

<When the Number of Divisions is 8 (FIG. 14)>

In FIG. 14, the search space 1 is assigned to PRB pairs #2, #8, #14, and #20, and the search space 2 is assigned to PRB pairs #0, #10, #16, and #20. That is, PRB pair #20 is assigned in an overlapping manner in the search space 1 and search space 2.

UE1 first allocates the eCCE indexes (eCCE #8 to eCCE #15) to 16 eCCEs of the search space 1. Accordingly, eCCE #0 to eCCE #7 of the search space 1 are assigned to PRB pairs #2 and #14, and eCCE #8 to eCCE #15 of the search space 1 are assigned to PRB pairs #8 and #20.

Next, UE1 determines the eCCE indexes of the search space 2. A combination of PRB pairs #10 and #20 as the PRB pairs assigned to the search space 2 includes PRB pair #20 assigned to the search space 1. Accordingly, UE1 allocates the eCCE indexes (eCCE #8 to eCCE #15) corresponding to PRB pairs #8 and #20 as a combination including PRB pair #20 of the search space 1 as the eCCE indexes of the search space 2 corresponding to PRB pairs #10 and #20.

A combination of PRB pairs #0 and #16 as the PRB pairs assigned to the search space 2 does not include the PRB pairs assigned to the search space 1. Accordingly, UE1 newly allocates the CCE indexes (eCCE #16 to eCCE #23) to PRB pairs #0 and #16.

<When the Number of Divisions is 16 (FIG. 15)>

In FIG. 15, the search space 1 is assigned to PRB pairs #2, #8, #14, and #20, and the search space 2 is assigned to PRB pairs #0, #8, #16, and #20. That is, PRB pairs #8 and #20 are assigned in an overlapping manner in the search space 1 and the search space 2.

UE1 first allocates the eCCE indexes (eCCE #0 to eCCE #15) to 16 eCCEs of the search space 1 in an ascending order. Accordingly, eCCE 0 to eCCE #15 of the search space 1 are assigned to PRB pairs #2, #8, #14, and #20.

Next, UE1 determines the eCCE indexes of the search space 2. A combination of PRB pairs #0, #8, #16, and #20 assigned to the search space 2 includes PRB pairs #8 and #10 assigned to the search space 1. Accordingly, UE1 allocates the same eCCE indexes as the CCE indexes (eCCE #0 to eCCE #15) of the search space 1 as the eCCE indexes of the search space 2.

In this way, base station 100 and terminal 200 allocate the same eCCE indexes as specific eCCEs to eCCEs, in which at least one PRB pair among a plurality of assigned PRB pairs is the same as a PRB pair assigned to specific eCCEs among a plurality of eCCEs of the search space 1, among a plurality of eCCEs of the search space 2. Base station 100 and terminal 200 allocate the eCCE indexes larger than the eCCE indexes of the search space 1 to the eCCEs other than the eCCEs, to which the same eCCE indexes as the specific eCCEs are allocated, among a plurality of eCCEs of the search space 2.

As described above, in the distributed assignment, an eCCE is assigned to a plurality of PRB pairs in eCCE units (for example, when a PRB pair is divided into 8 parts, in units of 8 eCCEs, and when a PRB pair is divided into 16 parts, in units of 16 eCCEs) corresponding to the number of divisions of a PRB pair in a distributed manner. Accordingly, as illustrated in FIG. 14 or 15, in the search space 2, the eCCEs to which the same eCCE indexes as the eCCE indexes of the search space 1 are in units of eCCEs corresponding to the number of divisions of a PRB pair.

In this way, even when the distributed assignment is applied to the search space 1 and the search space 2, when the overlapping PRB pair is assigned to a plurality of search spaces, the eCCE indexes corresponding to the PRB pair are the same between a plurality of search spaces. Accordingly, it is possible to reduce the total number of eCCE indexes of the entire search space (SS1 and SS2) configured in terminal 200, and to reduce the number of PUCCH resources corresponding to the eCCE indexes. Therefore, since it is also possible to reduce the number of PUCCH resources associated with the eCCEs, throughput in the uplink is improved.

In the present embodiment, the distributed assignment in the frequency domain has been described, a domain to which the distributed assignment is applied may be a time domain or a frequency-time domain.

Embodiment 4

In the present embodiment, a case where localized assignment and distributed assignment are mixedly applied in a plurality of ePDCCH search spaces that are configured in a terminal will be described. A base station and a terminal according to the present embodiment share the same basic configuration as base station 100 and terminal 200 according to Embodiment 1. Accordingly, description will be provided referring back to FIGS. 7 and 8.

The reason for mixing the localized assignment and the distributed assignment is to reduce the total number of PRB pairs to be used for an ePDCCH while selecting an assignment method (localized assignment and distributed assignment) for each terminal.

However, it is necessary to maintain the characteristic that, in the localized assignment, ePDCCHs are collectively assigned at positions close to each other on a frequency domain, and in the distributed assignment, ePDCCHs are assigned on a frequency domain in a distributed manner. In the distributed assignment, it is necessary to assign the same eCCE to different resources (eREGs) of each PRB pair, thereby averaging channel estimation precision and power per OFDM symbol. The characteristic of channel estimation precision is degraded as being away from a reference signal (RS). Since there is a restriction to power of the OFDM symbol value, if there are variations in OFDM symbols to be assigned, power boosting is not easily performed.

In this way, an assignment rule of a PRB pair to an eCCE varies in the localized assignment and the distributed assignment.

FIGS. 16A and 16B illustrate an example of the correspondence relationship of the eCCE indexes (FIG. 16A) and the PRB pairs (FIG. 16B) when the localized assignment and the distributed assignment are mixedly applied. In FIG. 16A, the distributed assignment is applied to the search space 1 (SS1), and the localized assignment is applied to the search space 2 (SS2). Hereinafter, the eCCEs of the search space 1 to which the distributed assignment is applied are simply referred to as "distributed eCCEs", and the eCCEs of the search space 2 to which the localized assignment is applied are simply referred to as "localized eCCEs".

In FIG. 16A, eCCE #0 to eCCE #15 are allocated to 16 eCCEs of the search space 1. In FIG. 16A, since 16 eCCEs of the search space 2 are assigned to the same PRB pairs #A to #D as the 16 eCCEs of the search space 1, eCCE #0 to eCCE #15 that are the same eCCE indexes as the 16 eCCEs of the search space 1 are assigned to the 16 eCCEs of the search space 2.

The same association of the eCCE indexes and the PUCCH resources (for example, see FIG. 3) is applied to both the distributed eCCEs and the localized eCCEs.

Each block illustrated in FIG. 16B represents an eREG, and a numeral within the block represents a distributed eCCE index (see FIG. 16A) that is assigned to the eREG. That is, in FIG. 16B, a PRB pair is divided into 16 eREGs, and one distributed eCCE is assigned to four PRB pairs. As shown in FIG. 16B, in the distributed assignment, different eREGs are used for each PRB pair. However, the arrangement of actual physical resources of eREGs is not limited to FIG. 16B, and REs included in an eREG are separately defined in advance.

In FIG. 16B, 4 localized CCEs are assigned per PRB pair. For example, localized eCCE #3 illustrated in FIG. 16A is assigned to the uppermost resources (the same resources as four eREGs corresponding to distributed eCCEs #3, #7, #11, and #15) of the PRB pair #A. Similarly, localized eCCE #7 illustrated in FIG. 16A is assigned to the uppermost resources (the same resources as four eREGs corresponding to distributed eCCEs #15, #6, #14, and #7) of PRB pair #B. The same applies to other localized eCCEs.

Locations surrounded by four kinds of rectangles in the search space 2 (localized assignment is applied) illustrated in FIG. 16A represent distributed eCCEs (in FIG. 16A, representing only distributed eCCEs #3, #7, #11, and #15 of the search space 1) in a PRB pair against which the respective localized eCCEs collide. For example, localized eCCE #7 of the search space 2 collides against distributed eCCEs #7 and #15 of the search space 1 in a PRB pair. Similarly, localized eCCE #8 collides against distributed eCCE #3 in a PRB pair. The same applies to other localized eCCEs.

Two kinds of filled regions in the search space 1 (distributed assignment is applied) illustrated in FIG. 16A represent the distributed eCCEs in a PRB pair against which the localized eCCEs #3 and #7 collide. For example, localized eCCE #3 of the search space 2 collides against distributed eCCEs #3, #7, #11, and #15 of the search space 1 in a PRB pair. Similarly, localized eCCE #7 collides against distributed eCCEs #6, #7, #14, and #15 in a PRB pair.

As shown in FIGS. 16A and 16B, when localized eCCE #3 is used for terminal 200, distributed eCCEs #3, #7, #11, and #15 which collide against each other in a PRB pair when being simultaneously used cannot be used. If distributed eCCEs #3, #7, #11, and #15 are not used, while localized eCCE #3 is usable, the localized eCCEs to which eCCE indexes (eCCEs #7, #11, and #15) other than eCCE #3 are assigned cannot be used. For example, even when distributed eCCEs #3, #7, #11, and #15 are not used, in order to use localized eCCE #7, it is necessary to newly avoid the use of distributed eCCEs #6 and #14.

That is, in FIGS. 16A and 16B, while the use of localized eCCE #3 is limited (blocked) by distributed eCCEs #3, #7, #11, and #15, the use of localized eCCE #7 is limited (blocked) by distributed eCCEs #6, #7, #14, and #15. This is because eCCE indexes do not match and are separated between distributed eCCE that are blocked by a localized eCCE and localized eCCEs that are blocked by a distributed eCCE. Specifically, in FIGS. 16A and 16B, while localized eCCE #3 limits (blocks) the use of distributed eCCEs #3, #7, #11, and #15, distributed CCE #3 limits the use of localized eCCEs #3, #5, #8, and #14. Similarly, while localized eCCE #7 limits (blocks) the use of distributed eCCEs #6, #7, #14, and #15, distributed CCE #7 limits the use of localized eCCEs #3, #7, #9, and #14.

In this way, in an example illustrated in FIGS. 16A and 16B, a localized eCCE against which a distributed eCCE collides and a distributed eCCE against which a localized eCCE collides have no regularity, and there are variations in eCCEs (eCCEs to be blocked) that cannot be used by eCCEs selected in a search space to which one assignment method is applied. Accordingly, if the association of both a distributed eCCE and a localized CCE with the same PUCCH resource (for example, see FIG. 3) is applied, there are variations in the limits (blocking) to the use of the PUCCH resources that are associated with the eCCEs assigned both search spaces, and the utilization efficiency of the PUCCHs is degraded.

Since a distributed eCCE is distributed and assigned to M PRB pairs, at least M localized eCCEs are blocked by any distributed eCCE. Since a localized eCCE is assigned to resources corresponding to M eREGs, M distributed eCCEs are blocked by any localized eCCE. The association of both a distributed eCCE and a localized CCE with the same PUCCH resource (for example, see FIG. 3) is applied.

Accordingly, in the present embodiment, eCCE assignment such that collision occurs in units of M eCCEs in a PRB pair is defined between the localized assignment and the distributed assignment. M represents the number of divisions (eCCE diversity order) in which an eCCE is divided during the distributed assignment. For example, when the number of divisions of a PRB pair is 8, 12, 16, 24, and 36, M=2, 3, 4, 6, and 9.

Specifically, in the present embodiment, base station 100 and terminal 200 assign the resources, to which specific M localized eCCEs are assigned, to the same resources as the resources to which M distributed eCCEs (that is, distributed eCCEs that block the M localized eCCEs), to which the same eCCE indexes as the M localized eCCEs are allocated, are assigned. That is, when the localized assignment and the distributed assignment are mixedly applied in the search space 1 and the search space 2 configured in terminal 200, specific localized eCCEs corresponding to the number of a plurality of PRB pairs (M PRB pairs) to which distributed eCCEs are distributed and assigned are assigned to the same resources (RE) as the eREGs to which distributed eCCEs, to which the same eCCE indexes as the specific localized eCCEs are allocated, are assigned.

For example, base station 100 and terminal 200 assign localized eCCEs #N, #N+4, #N+8, and #N+12 to the resources (eREGs) to which distributed eCCEs #N, #N+4, #N+8, and #N+12 are assigned. That is, in the distributed assignment and the localized assignment, the eCCEs corresponding to the number of divisions M when dividing an eCCE are assigned to the same resource.

Figures 17A, 17B:
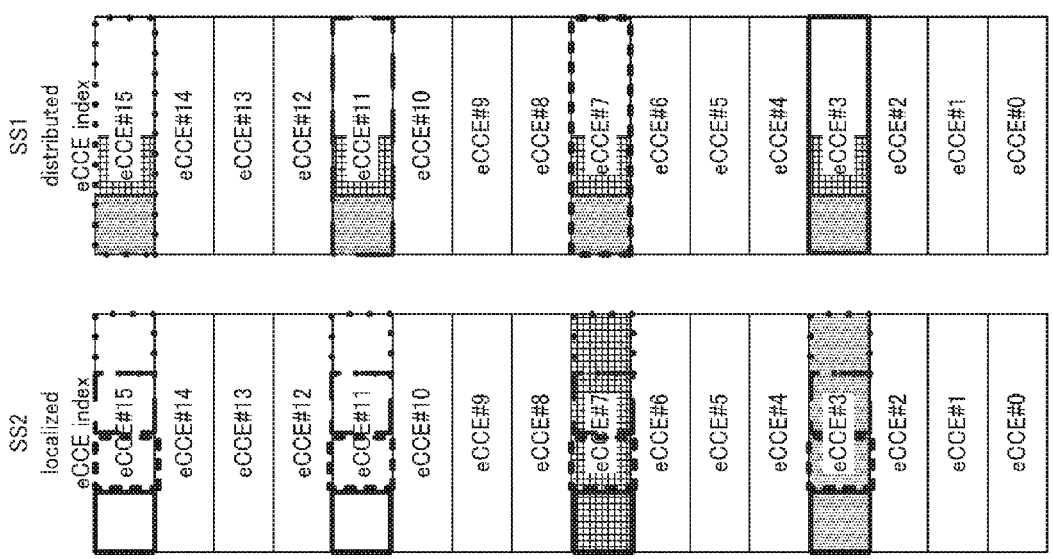
FIGS. 17A and 17B are diagrams illustrating a search space configuration example according to Embodiment 4 of the present invention (the number of divisions of a PRB pair: 16)

FIGS. 17A and 17B illustrate the correspondence relationship between eCCE indexes (FIG. 17A) and PRB pairs (FIG. 17B) in the present embodiment. In FIG. 17B, similarly to FIG. 16B, four localized CCE indexes are assigned per PRB pair. In FIG. 17B, similarly to FIG. 16B, a PRB pair is divided into 16 eREGs, and the number of divisions (eCCE diversity order) of an eCCEs in the distributed assignment is 4 (M=4). In FIG. 17A, as in Embodiment 2, the same PRB pairs #A to #D are assigned in the search space 1 and the search space 2, and the same eCCE indexes (eCCEs #0 to #15) are allocated to both search spaces.

In FIGS. 17A and 17B, the assignment of distributed eCCEs in a PRB pair is the same as in FIG. 16B. That is, in FIG. 17B, distributed eCCEs #3, #7, #11, and #15 are assigned to the resources (eREGs) within the PRB pairs #A, #B, #C, and #D, and the position of the resource (eREG) varies for each PRB pair.

Localized eCCEs #3, #7, #11, and #15 are assigned to the resources (eREGs), to which distributed eCCEs #3, #7, #11, and #15 are assigned, in PRB pairs #A, #B, #C, and #D. For example, localized eCCE #7 is assigned to the same resources as four eREGs corresponding to distributed eCCEs #3, #7, #11, and #15 in PRB pair #B. Similarly, localized eCCE #11 is assigned to the same resources as four eREGs corresponding to distributed eCCEs #3, #7, #11, and #15 in PRB pair #C. The same applies to localized eCCEs #3 and #15.

With this, the eCCE indexes of M distributed eCCEs that are blocked by any localized eCCE match M localized eCCE indexes that are blocked by localized eCCEs having the same eCCE indexes as distributed eCCEs having the same eCCE indexes as the localized eCCEs. For example, in FIGS. 17A and 17B, localized eCCE #3 (or #7, #11, #15) blocks distributed eCCEs #3, #7, #11, and #15, and distributed eCCE #3 (or #7, #11, #15) blocks localized eCCEs #3, #7, #11, and #15.

Accordingly, the number of localized eCCEs that cannot be used (are blocked) by a distributed eCCE can be limited to M. As described above, since M corresponds to the number of PRB pairs in which distributed eCCEs are distributed and arranged, at least M localized eCCEs are blocked by the use of any distributed eCCE. That is, according to the present embodiment, it is possible to minimize the number of localized eCCEs that are cannot be used by a distributed eCCE. Accordingly, it is possible to minimize the number of PUCCH resources to be blocked.

In FIGS. 17A and 17B, although the case of localized eCCEs #3, #7, #11, and #15 and distributed eCCEs #3, #7, #11, and #15 (that is, N=3) has been described, the same applies to other eCCEs (N=0, 1, 2).

In this way, in the present embodiment, the resources within a PRB pair to which the same eCCE indexes are assigned are shared by the localized assignment and the distributed assignment. Accordingly, while the assignment rule of an eCCE in a PRB pair varies in the localized assignment and the distributed assignment, collision of eCCE indexes and collision of PUCCH resources match each other. Therefore, according to the present embodiment, wasteful resource assignment in a PUCCH is reduced, thereby improving the utilization efficiency of the PUCCHs.

For example, base station 100 configures the search space 1 and the search space 2 for each terminal 200, and easily switches between the distributed assignment and the localized assignment based on the channel quality of each terminal 200, reliability of feedback information, or the like.

In the present embodiment, a case where different assignment methods are applied to a plurality of search spaces configured in one terminal 200 has been described. However, the present embodiment is not limited thereto, and for example, is effective for a case where the distributed assignment is applied to UE1, the localized assignment is applied to UE2, and the PRB pairs corresponding to the eCCEs of the respective search spaces are the same.

Figures 18A, 18B:
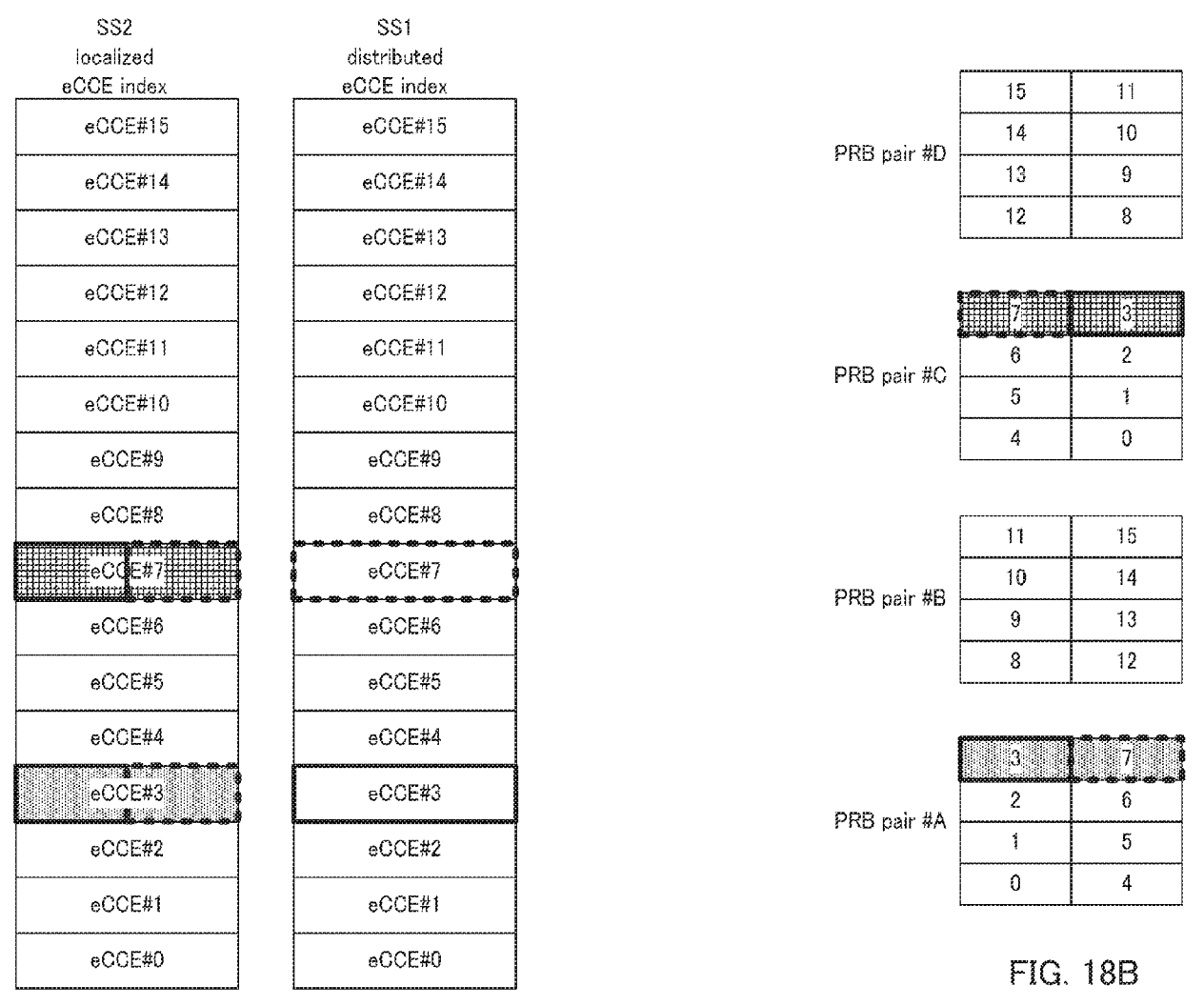

In the present embodiment, a case where a PRB pair is divided into 16 parts (M=4) has been described, the present invention is not limited thereto. For example, when a PRB pair is divided into 8 parts (M=2), base station 100 and terminal 200 arrange localized eCCEs #N and #N+4 in the resources to which distributed eCCEs #N and #N+4 are assigned. FIGS. 18A and 18B illustrate a search space configuration example when M=2. In FIGS. 18A and 18B, distributed eCCEs #3 and #7 are assigned to PRB pairs #A and #C, and the position of the resource (eREG) varies for each PRB pair. Localized CCEs #3 and #7 are assigned to the resources, to which distributed eCCEs #3 and #7 are assigned, in PRB pairs #A and #C. That is, in the distributed assignment and the localized assignment, the eCCEs corresponding to the number of divisions M=2 when dividing an eCCE are assigned to the same resource. With this, it is possible to limit the number of localized eCCEs whose use is limited (blocked) by a distributed eCCE, and to limit the number of PUCCH resources to be blocked. For example, localized eCCE #3 blocks only distributed eCCEs #3 and #7, and distributed eCCE #3 blocks only localized eCCEs #3 and #7. Similarly, localized eCCE #7 blocks only distributed eCCEs #3 and #7, and distributed eCCE #7 blocks only localized eCCEs #3 and #7.

Figure 19B:
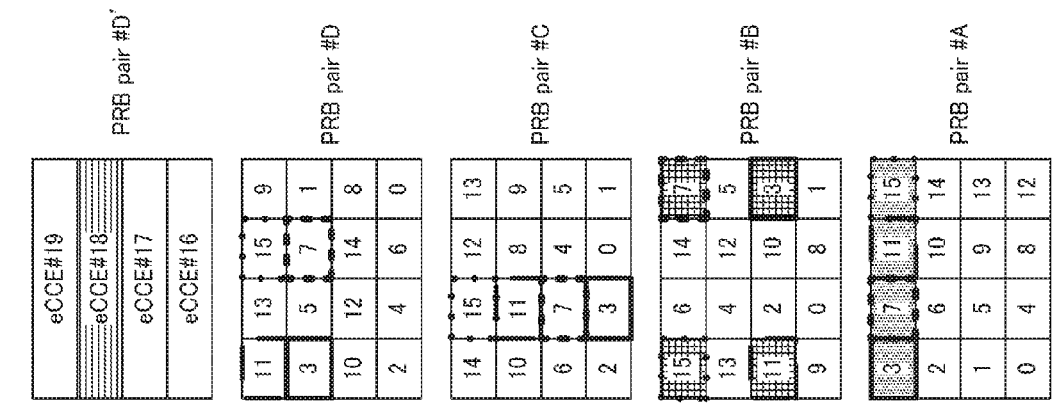
FIGS. 19A and 19B are diagrams illustrating another search space configuration example according to Embodiment 4 of the present invention.
Figure 19A:
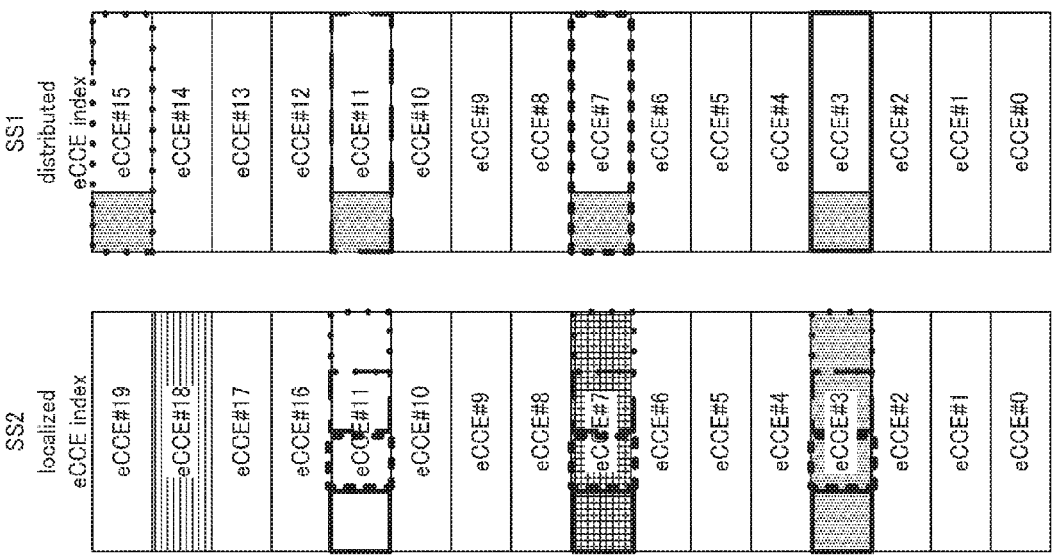

As in Embodiment 2 (FIG. 10), when the same PRB pair is assigned to some eCCEs between a plurality of search spaces configured in one terminal 200, and different PRB pairs are individually assigned to other eCCEs (for example, see FIGS. 19A and 19B), as in the present embodiment, the same resources as distributed eCCEs (distributed eCCEs #3,

7, #11, and #15) that are blocked by localized eCCEs are assigned to the localized eCCEs (localized eCCEs #3, #7, and #11) to which a PRB pair is assigned, and resources of an individual PRB pair (PRB pair #D') are assigned to localized eCCEs (localized eCCEs #16 to #19) that are assigned to the different PRB pairs. In this way, in the localized eCCEs assigned to different PRB pairs, the eCCEs can be used to transmit the ePDCCH without taking into consideration collision with distributed eCCEs.

In the present embodiment, the distributed assignment and the localized assignment in the frequency domain have been described, a domain to which the distributed assignment and the localized assignment are applied may be a time domain or a frequency-time domain.

The foregoing describes the embodiments of the present invention.

Other Embodiments

[1] In the foregoing embodiments, a case where one search space includes 16 eCCEs has been described. However, the number of eCCEs included in one search space is not limited to 16. The number of PRB pairs and the number of eCCEs may vary in the search space 1 and the search space 2 that are configured in one terminal.

[2] In the foregoing embodiments, although a case where implicit resources of a PUCCH are defined by the association of eCCE indexes and PUCCH resources has been described, instead of the eCCE indexes, eREG indexes may be used.

[3] As a way to change the implicit assignment method by the association with eCCE indexes and PUCCH resources to a different assignment method, there are (1) a method of giving notification of the start position of the PUCCH resource for each terminal or each search space, (2) a method of giving notification of ARI (ACK/NACK Resource Indicator) with a DL assignment and adding a shift amount corresponding to the ARI to the implicit resources of the PUCCH, and (3) a method of using explicit resources corresponding to the ARI, and these methods can be used along with the foregoing embodiments. For example, as in the method (1), when the start position of the PUCCH resource varies for each search space, in a PRB pair that is shared in the search space 1 and the search space 2, the start position of the PUCCH resource of the search space 1 may be notified. As in the method (2), when giving notification of the shift amount with the ARI, as the shift amount, a shift amount of a PUCCH may be defined or a shift amount of an eCCE index may be defined.

[4] In the foregoing embodiments, although a case where an ePDCCH search space is configured has been described, the above-described search space configuration method can be applied to a R-PDCCH which is a control signal for relay, instead of an ePDCCH.

[5] The term "antenna port" refers to a logical antenna including one or more physical antennas. In other words, the term "antenna port" does not necessarily refer to a single physical antenna, and may sometimes refer to an array antenna including a plurality of antennas, and/or the like.

For example, how many physical antennas are included in the antenna port is not defined in LTE, but the antenna port is defined as the minimum unit allowing the base station to transmit different reference signals in LTE.

In addition, an antenna port may be specified as a minimum unit to be multiplied by a precoding vector weighting.

[6] In the foregoing embodiments, the present invention is configured with hardware by way of example, but the invention may also be provided by software in cooperation with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A base station apparatus according to the embodiments described above includes: a configuration section that configures, within a data assignable region for a terminal apparatus, a first search space and a second search space each being a candidate to which control information is assigned, each of the first search space and the second search space including a plurality of control channel elements; and a transmission section that transmits the control information assigned to each of the first search space and the second search space, in which: a number of a control channel element to which the control information is assigned is associated on a one-to-one basis with an uplink resource to be used to transmit a response signal to downlink data; and the configuration section allocates numbers to a plurality of first control channel elements included in the first search space in an ascending order, and allocates numbers larger than or identical with the numbers allocated to the first control channel elements to a plurality of second control channel elements included in the second search space.

In the base station apparatus according to the embodiments, the plurality of control channel elements are respectively assigned to physical resources; and the configuration section allocates a number identical with a third control channel element among the plurality of first control channel elements to a fourth control channel element assigned to a physical resource identical with a physical resource to which the third control channel element is assigned, among the plurality of second control channel elements, and allocates a number larger than the numbers allocated to the plurality of first control channel elements to a control channel element other than the fourth control channel element among the plurality of second control channel elements.

In the base station apparatus according to the embodiments: the plurality of control channel elements are assigned to a plurality of physical resources distributed in a frequency domain; and the configuration section allocates a number identical with a third control channel element among the plurality of first control channel elements to a fourth control channel element assigned to physical resources including at least one physical resource that is identical with a physical resource assigned to the third control channel element, among the plurality of second control channel elements, and allocates a number larger than the numbers allocated to the plurality of first control channel elements to a control channel element other than the fourth control channel element among the plurality of second control channel elements.

In the base station apparatus according to the embodiments: a plurality of control channel elements included in one of the first search space and the second search space are assigned to a single physical resource in a frequency domain, and a plurality of control channel elements included in the other one of the search spaces are assigned to a plurality of physical resources distributed in the frequency domain; a number of resource elements included in the single physical resource is equal to a total number of resource elements included in the plurality of physical resources; and specific control channel elements corresponding to the number of the plurality of physical resources in the one of the search spaces are assigned to resource elements identical with resource elements to which the control channel elements of the other one of the search spaces are assigned, the control channel elements of the other one of the search spaces being allocated a number identical with the specific control channel elements.

In the base station apparatus according to the embodiments, the first search space is a search space that is shared by a plurality of terminal apparatuses, and the second search space is a search space that is individually configured for each of the terminal apparatuses.

In the base station apparatus according to the embodiments, the first search space and the second search space are each a search space individually configured for the terminal apparatus, and the first search space is used with priority over the second search space.

In the base station apparatus according to the embodiments: communication with the terminal apparatus is performed using a plurality of component carriers (CCs) including a primary cell and one or more secondary cells; and the first search space is a search space to which control information for a primary cell is assigned, and the second search space is a search space to which control information for a secondary cell is assigned.

A terminal apparatus according to the embodiments described above includes: a configuration section that configures, within a data assignable region, a first search space and a second search space each being a candidate to which control information is assigned, each of the first search space and the second search space including a plurality of control channel elements; and a reception section that receives the control information assigned to each of the first search space and the second search space, in which: a number of a control channel element to which the control information is assigned is associated on one-to-one basis with an uplink resource to be used to transmit a response signal to downlink data; and the configuration section allocates numbers to a plurality of first control channel elements included in the first search space in an ascending order, and allocates numbers larger than or identical with the numbers allocated to the first control channel elements to a plurality of second control channel elements included in the second search space.

In the terminal apparatus according to the embodiments: the plurality of control channel elements are respectively assigned to physical resources, and the configuration section allocates a number identical with a third control channel element among the plurality of first control channel elements to a fourth control channel element assigned to a physical resource identical with a physical resource to which the third control channel element is assigned among the plurality of second control channel elements and allocates a number larger than the numbers allocated to the plurality of first control channel elements to a control channel element other than the fourth control channel element among the plurality of second control channel elements.

In the terminal apparatus according to the embodiments: the plurality of control channel elements are assigned to a plurality of physical resources distributed in a frequency domain; and the configuration section allocates a number identical with a third control channel element among the plurality of first control channel elements to a fourth control channel element assigned to physical resources including at least one physical resource that is identical with a physical resource assigned to the third control channel element, among the plurality of second control channel elements, and allocates a number larger than the numbers allocated to the plurality of first control channel elements to a control channel element other than the fourth control channel element among the plurality of second control channel elements.

In the terminal apparatus according to the embodiments: a plurality of control channel elements included in one of the first search space and the second search space are assigned to a single physical resource in a frequency domain, and a plurality of control channel elements included in the other one of the search spaces are assigned to a plurality of physical resources distributed in the frequency domain; a number of resource elements included in the single physical resource is equal to a total number of resource elements included in the plurality of physical resources; and specific control channel elements corresponding to the number of the plurality of physical resources in the one of the search spaces are assigned to resource elements identical with resource elements to which the control channel elements of the other one of the search spaces are assigned, the control channel elements of the other one of the search spaces being allocated a number identical with the specific control channel elements.

In the terminal apparatus according to the embodiments, the first search space is a search space that is shared by a plurality of terminal apparatuses, and the second search space is a search space that is individually configured for each of the terminal apparatuses.

In the terminal apparatus according to the embodiments, the first search space and the second search space are each a search space that is individually configured for the terminal apparatus, and the first search space is used with priority over the second search space.

In the terminal apparatus according to the embodiments: communication with the terminal apparatus is performed using a plurality of component carriers (CCs) having a primary cell and one or more secondary cells; and the first search space is a search space to which control information for a primary cell is assigned, and the second search space is a search space to which control information for a secondary cell is assigned.

A transmission method according to the embodiments described above includes: configuring, within a data assignable region for a terminal apparatus, a first search space and a second search space each being a candidate to which control information is assigned, each of the first search space and the second search space including a plurality of control channel elements; and transmitting the control information assigned to each of the first search space and the second search space, in which: a number of a control channel element to which the control information is assigned is associated on a one-to-one basis with an uplink resource to be used to transmit a response signal to downlink data; and numbers are allocated to a plurality of first control channel elements included in the first search space in an ascending order, and numbers larger than or identical with the numbers allocated to the first control channel elements are allocated to a plurality of second control channel elements included in the second search space.

A reception method according to the embodiments described above includes: configuring, within a data assignable region for a terminal apparatus, a first search space and a second search space each being a candidate to which control information is assigned, each of the first search space and the second search space including a plurality of control channel elements; and receiving the control information assigned to each of the first search space and the second search space, in which: a number of a control channel element to which the control information is assigned is associated on a one-to-one basis with an uplink resource to be used to transmit a response signal to downlink data; and numbers are allocated to a plurality of first control channel elements included in the first search space in an ascending order, and numbers larger than or identical with the numbers allocated to the first control channel elements are allocated to a plurality of second control channel elements included in the second search space.

The disclosure of Japanese Patent Application No. 2012-164619, filed on Jul. 25, 2012, including the specification, drawings and abstract are incorporated herein by reference in its entirety.

INDUSTRIAL APPLICABILITY

The present invention is useful in that, even when a plurality of ePDCCH search spaces are configured for a single terminal, it is possible to avoid collision of PUCCH resources between terminals.

REFERENCE SIGNS LIST

100 Base station
200 Terminal
101 Assignment information generation section
102, 205 Configuration section
103, 207 Error correction coding section
104, 208 Modulation section
105, 209 Signal assignment section
106, 210 Transmission section
107, 201 Reception section
108, 203 Demodulation section
109, 204 Error correction decoding section
110 A/N signal demodulation section
202 Signal separation section
206 Control signal reception section

The invention claimed is:

1. An integrated circuit comprising:
receiving circuitry, which, in operation, controls reception of physical resource block (PRB) pair information related to PRB pairs; and
specifying circuitry, which is coupled to the receiving circuitry and which, in operation, specifies, based on the PRB pair information, at least one of (i) a first search space for localized transmission, which is comprised of a plurality of first control channel elements (CCEs), each first CCE consisting of four enhanced resource element groups (EREGs) in one PRB pair, and (ii) a second search space for distributed transmission, which is comprised of a plurality of second CCEs, each second CCE consisting of four EREGs distributed among a plurality of PRB pairs, wherein each of the one or the plurality of PRB pairs is divided into sixteen EREGs;
wherein the receiving circuitry, in operation, controls reception of assignment information mapped to at least one of the first search space and the second search space, and
wherein four EREGs provided in one PRB pair, which form a portion of EREGs that correspond to a subset of the plurality of second CCEs, are identical to four EREGs that correspond to one first CCE of a subset of the plurality of first CCEs, and four EREGs provided in another PRB pair, which form another portion of the EREGs that correspond to said subset of the plurality of second CCEs, are identical to four EREGs that correspond to another first CCE of said subset of the plurality of first CCEs.

2. The integrated circuit according to claim 1, comprising:
at least one input coupled to the receiving circuitry, wherein the at least one input, in operation, inputs data; and
at least one output coupled to the specifying circuitry, wherein the at least one output, in operation, outputs data.

3. The integrated circuit according to claim 2, wherein the at least one output and the at least one input, in operation, are coupled to an antenna.

4. The integrated circuit according to claim 1, wherein the subset of the plurality of first CCEs is comprised of four first CCEs and the subset of the plurality of second CCEs is comprised of four second CCEs.

5. The integrated circuit according to claim 1, wherein the specifying circuitry, in operation, specifies the plurality of PRB pairs as the first search space or the second search space, and the plurality of first CCEs or the plurality of second CCEs, which constitute the plurality of PRB pairs, are sequentially numbered from zero.

6. The integrated circuit according to claim 1, wherein the specifying circuitry, in operation, specifies first PRB pairs defining the first search space and second PRB pairs defining the second search space, the plurality of first CCEs constituting the first PRB pairs are sequentially numbered from zero, and the plurality of second CCEs constituting the second PRB pairs are sequentially numbered from zero.

7. The integrated circuit according to claim 1, wherein one second CCE corresponds to different EREGs in different PRB pairs.

8. The integrated circuit according to claim 1, wherein at least one of the first search space and the second search space is specified in a physical downlink shared channel (PDSCH) region, each of the plurality of first CCEs and the plurality of second CCEs is an enhanced CCE (ECCE), and the assignment information is received on an enhanced physical downlink control channel (EPDCCH).

9. An integrated circuit comprising:
circuitry, which, in operation:
controls reception of physical resource block (PRB) pair information related to PRB pairs;
specifies, based on the PRB pair information, at least one of (i) a first search space for localized transmission, which is comprised of a plurality of first control channel elements (CCEs), each first CCE consisting of four enhanced resource element groups (EREGs) in one PRB pair, and (ii) a second search space for distributed transmission, which is comprised of a plurality of second CCEs, each second CCE consisting of four EREGs distributed among a plurality of PRB pairs, wherein each of the one or the plurality of PRB pairs is divided into sixteen EREGs; and controls reception of assignment information mapped to at least one of the first search space and the second search space; and at least one input coupled to the circuitry, wherein the at least one input, in operation, inputs data, wherein four EREGs provided in one PRB pair, which form a portion of EREGs that correspond to a subset of the plurality of second CCEs, are identical to four EREGs that correspond to one first CCE of a subset of the plurality of first CCEs, and four EREGs provided in another PRB pair, which form another portion of the EREGs that correspond to said subset of the plurality of second CCEs, are identical to four EREGs that correspond to another first CCE of said subset of the plurality of first CCEs.

10. The integrated circuit according to claim 9, comprising:

at least one output coupled to the circuitry, wherein the at least one output, in operation, outputs data.

11. The integrated circuit according to claim 10, wherein the at least one output and the at least one input, in operation, are coupled to an antenna.

12. The integrated circuit according to claim 9, wherein the subset of the plurality of first CCEs is comprised of four first CCEs and the subset of the plurality of second CCEs is comprised of four second CCEs.

13. The integrated circuit according to claim 9, wherein the circuitry, in operation, specifies the plurality of PRB pairs as the first search space or the second search space, and the plurality of first CCEs or the plurality of second CCEs, which constitute the plurality of PRB pairs, are sequentially numbered from zero.

14. The integrated circuit according to claim 9, wherein the circuitry, in operation, specifies first PRB pairs defining the first search space and second PRB pairs defining the second search space, the plurality of first CCEs constituting the first PRB pairs are sequentially numbered from zero, and the plurality of second CCEs constituting the second PRB pairs are sequentially numbered from zero.

15. The integrated circuit according to claim 9, wherein one second CCE corresponds to different EREGs in different PRB pairs.

16. The integrated circuit according to claim 9, wherein at least one of the first search space and the second search space is specified in a physical downlink shared channel (PDSCH) region, each of the plurality of first CCEs and the plurality of second CCEs is an enhanced CCE (ECCE), and the assignment information is received on an enhanced physical downlink control channel (EPDCCH).

* * * * *